US009540554B2

(12) United States Patent
Minor et al.

(10) Patent No.: US 9,540,554 B2
(45) Date of Patent: *Jan. 10, 2017

(54) REFRIGERANT MIXTURES COMPRISING TETRAFLUOROPROPENE, DIFLUOROMETHANE, PENTAFLUOROETHANE, AND TETRAFLUOROETHANE, AND USES THEREOF

(71) Applicant: CHEMOURS COMPANY FC LLC, Wilmington, DE (US)

(72) Inventors: Barbara Haviland Minor, Elkton, MD (US); Charles Clinton Allgood, Elkton, MD (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,956

(22) Filed: Jul. 25, 2014

(65) Prior Publication Data

US 2014/0331697 A1 Nov. 13, 2014

Related U.S. Application Data

(63) Continuation-in-part of application No. 14/374,631, filed as application No. PCT/US2013/025656 on Feb. 12, 2013.

(60) Provisional application No. 61/598,120, filed on Feb. 13, 2012.

(51) Int. Cl.
| | | |
|---|---|---|
| G06K 5/04 | (2006.01) | |
| C09K 5/04 | (2006.01) | |
| C10M 171/00 | (2006.01) | |
| F25B 45/00 | (2006.01) | |
| F25B 1/00 | (2006.01) | |

(52) U.S. Cl.
CPC .......... C09K 5/045 (2013.01); C10M 171/008 (2013.01); F25B 1/005 (2013.01); F25B 45/00 (2013.01); *C09K 2205/126* (2013.01); *C09K 2205/22* (2013.01); *C09K 2205/32* (2013.01); *C09K 2205/40* (2013.01); *C09K 2205/43* (2013.01); *C10N 2220/302* (2013.01); *C10N 2230/64* (2013.01); *F25B 2345/001* (2013.01)

(58) Field of Classification Search
CPC ................ C09K 5/045; C09K 2205/22; C09K 2205/126

See application file for complete search history.

(56) References Cited

U.S. PATENT DOCUMENTS

| | | | |
|---|---|---|---|
| 5,399,549 A | 3/1995 | Felix et al. | |
| 8,024,937 B2 | 9/2011 | Minor | |
| 2004/0256594 A1 | 12/2004 | Singh et al. | |
| 2006/0106263 A1 | 5/2006 | Miller et al. | |
| 2006/0243944 A1 | 11/2006 | Minor et al. | |
| 2006/0243945 A1 | 11/2006 | Minor et al. | |
| 2007/0284555 A1 | 12/2007 | Leck et al. | |
| 2009/0278075 A1 | 11/2009 | Mahler et al. | |
| 2010/0122545 A1 | 5/2010 | Minor et al. | |
| 2011/0219815 A1* | 9/2011 | Yana Motta | C09K 5/045 62/498 |
| 2012/0255316 A1* | 10/2012 | Andre | C09K 5/044 62/98 |
| 2013/0096218 A1 | 4/2013 | Rached et al. | |

FOREIGN PATENT DOCUMENTS

| | | |
|---|---|---|
| WO | 2010/059677 A2 | 5/2010 |
| WO | 2010/129920 A1 | 11/2010 |
| WO | 2011/161419 A1 | 12/2011 |
| WO | 2011/163117 A1 | 12/2011 |
| WO | 2012/151238 A2 | 11/2012 |
| WO | 2013/122892 A1 | 8/2013 |

OTHER PUBLICATIONS

PCT International Search Report and Written Opinion Mailed Oct. 1, 2015.
ASHRAE Standard Designation and Safety Classification of Refrigerants, ANSI/ASHRAE Standard 34-2010, Atlanta, GA.
ASTM International Designation: E 681-01, Standard Test Method for Concentration Limits of Flammability of Chemicals (Vapors and Gases), 2001, pp. 1-12, West Conshohocken, PA.

* cited by examiner

*Primary Examiner* — John Hardee
(74) *Attorney, Agent, or Firm* — N. Lynn Tucker

(57) ABSTRACT

A non-flammable refrigerant mixture is disclosed. The non-flammable refrigerant mixture may include from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and optionally (e) from about 0.0001 weight percent to 10 weight percent trans-HFO-1234ze. These refrigerant mixtures are useful as components in compositions also containing non-refrigerant components (e.g., lubricants), in processes to produce cooling, in methods for replacing refrigerants R-404A, R-507, R-407A, R-407C, R-407F and/or R-22, and in refrigeration apparatuses.

18 Claims, No Drawings

REFRIGERANT MIXTURES COMPRISING TETRAFLUOROPROPENE, DIFLUOROMETHANE, PENTAFLUOROETHANE, AND TETRAFLUOROETHANE, AND USES THEREOF

CROSS-REFERENCE TO RELATED APPLICATIONS

This patent application is a continuation-in-part of U.S. application Ser. No. 14/374,631 filed Jul. 25, 2014 which represents a national filing under 35. U.S.C. 371 of International Application No. PCT/US2013/025656, having an international filing date of Feb. 12, 2013, which claims priority to U.S. Provisional Application No. 61/598,120, filed Feb. 13, 2012, both of which are incorporated by reference in their entirety.

TECHNICAL FIELD

The present disclosure relates to compositions for use in refrigeration systems. In particular these compositions are useful in processes for producing cooling, methods for replacing refrigerants, and refrigeration apparatuses.

BACKGROUND

The refrigeration industry has been working for the past few decades to find replacement refrigerants for existing refrigerants including ozone-depleting chlorofluorocarbons (CFCs) and hydrochlorofluorocarbons (HCFCs). These existing refrigerants are being phased out as a result of the Montreal Protocol. The solution for most refrigerant producers has been the commercialization of hydrofluorocarbon (HFC) refrigerants. Some new HFC refrigerants have zero ozone depletion potential and are therefore not currently subject to the Montreal Protocol phase-out.

Further environmental regulations, however, may ultimately cause global phase out of some of these HFC refrigerants due to their global warming potential (GWP). Currently, industry is facing regulations relating to GWPs for refrigerants used in mobile air-conditioning systems. If the regulations are more broadly applied in the future, for instance to stationary air conditioning and refrigeration systems, an even greater need will be felt for refrigerants that can be used in all areas of the refrigeration and air-conditioning industry. Uncertainty as to the ultimate regulatory requirements relative to GWP has forced the industry to consider multiple candidate compounds and mixtures.

Previously-proposed replacement refrigerants for HFC refrigerants and refrigerant blends include HFC-152a, pure hydrocarbons, such as butane or propane, or "natural" refrigerants, such as $CO_2$. Each of these suggested replacements is associated with numerous problems, including toxicity, flammability, and low energy efficiency, and may further require major equipment design modifications. New replacements are also being proposed for the refrigerants R-22, R-134a, R-404A, R-507, R-407A, R-407C, R-407F, and R-410A, among others. The uncertainty regarding future GWP regulatory requirements has caused the industry to look for compounds and mixtures that balance the need for low GWP and non-flammability, as well as the need to match existing system performance parameters.

BRIEF SUMMARY

Certain compositions including tetrafluoropropene, difluoromethane, pentafluoroethane and tetrafluoroethane have been found to possess suitable properties that allow these compounds to be used as replacements for refrigerants having high GWPs. In particular, compositions including these compounds may be used to replace the refrigerants R-404A, R-507, R-407A, R-407C, R-407F, and/or R-22 in existing refrigeration systems and apparatuses. Compositions including these compounds may also be used in new refrigeration systems and apparatuses.

In accordance with embodiments of the present invention, a non-flammable refrigerant mixture is provided. The non-flammable refrigerant mixture may include (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and (e) from about 0.0001 weight percent to 10 weight percent HFO-1234ze.

In further embodiments, a composition may include from 23.3 weight percent to 24.5 weight percent difluoromethane (HFC-32), from 24.5 weight percent to 25.7 weight percent pentafluoroethane (HFC-125), from 25.5 weight percent to 26.7 weight percent 1,1,1,2-tetrafluoroethane (HFC-134a), and from 24.3 weight percent to 25.5 weight percent 2,3,3,3-tetrafluoropropene (HFO-1234yf). This composition may be used, for example, in a non-flammable refrigerant mixture.

These refrigerant mixtures may also be included in compositions that contain non-refrigerant components (e.g., lubricants). These compositions may be used in processes for producing a cooling effect, in methods for replacing the refrigerants R-404A, R-507, R-407A, R-407C, R-407F, and/or R-22, and in refrigeration apparatuses and/or systems.

DETAILED DESCRIPTION

Before addressing details of embodiments described below, some terms are defined or clarified.

DEFINITIONS

As used herein, the term heat transfer fluid includes a composition used to carry heat from a heat source to a heat sink.

A heat source includes any space, location, object, or body from which it is desirable to add, transfer, move, or remove heat. Examples of heat sources include spaces (open or enclosed) requiring refrigeration or cooling, such as refrigerator or freezer cases in a supermarket, transport refrigerated containers, building spaces requiring air conditioning, industrial water chillers, and the passenger compartment of an automobile requiring air conditioning. In some examples, the heat transfer fluid may remain in a constant state throughout the transfer process (e.g., not evaporate or condense). In other examples, evaporative cooling processes may utilize heat transfer fluids, as well.

A heat sink includes any space, location, object, or body capable of absorbing heat. A vapor compression refrigeration system is one example of such a heat sink.

A refrigerant includes as a heat transfer fluid that undergoes a phase change from liquid to gas and back again during a cycle used to transfer heat.

A heat transfer system includes the system or apparatus that is used to produce a heating or cooling effect in a particular space. A heat transfer system may be a mobile system and/or a stationary system.

Examples of heat transfer systems include any type of refrigeration system and/or air conditioning system. For example, heat transfer systems include, but are not limited to, air conditioners, freezers, refrigerators, heat pumps, water chillers, flooded evaporator chillers, direct expansion chillers, walk-in coolers, mobile refrigerators, mobile air conditioning units, dehumidifiers, and combinations thereof.

As used herein, a mobile heat transfer system includes any refrigeration, air conditioner, and/or heating apparatus incorporated into a transportation unit for the road, rail, sea, and/or air. In addition, mobile refrigeration and/or air conditioner units include apparatuses that are independent of any moving carrier and are known as "intermodal" systems. Such intermodal systems include "containers" (combined sea/land transport) and "swap bodies" (combined road/rail transport) freight containers for transport.

As used herein, stationary heat transfer systems include systems that are fixed in place during operation. A stationary heat transfer system may be located within, attached to, or otherwise associated with buildings of any variety. Additionally or alternatively, a stationary heat transfer system may be a stand-alone device located outdoors, such as a soft drink vending machine. These stationary applications may include stationary air conditioning units and heat pumps, including, but not limited to, chillers; high temperature heat pumps; and residential, commercial, or industrial air conditioning systems (including residential heat pumps). Stationary systems further include window, ductless, ducted, and packaged terminal systems, as well as systems that are exterior but connected to a building, such as rooftop systems. In stationary refrigeration applications, the disclosed compositions may be useful in various items of equipment, including commercial, industrial, or residential refrigerators and freezers; ice machines; self-contained coolers and freezers; flooded evaporator chillers; direct expansion chillers; walk-in and reach-in coolers and freezers; and combination systems. In some embodiments, the disclosed compositions may be used in supermarket refrigeration systems. Additionally, stationary applications may utilize a secondary loop system, where a secondary fluid is cooled by a primary refrigerant, and the secondary fluid is then pumped to a remote location in order to provide a cooling effect at that remote location.

Refrigeration capacity (also sometimes referred to as "cooling capacity" or "capacity") is a term that may refer to the change in enthalpy of a refrigerant (or refrigerant mixture) in an evaporator per unit mass of refrigerant (or refrigerant mixture) circulated. The term may also refer to the heat removed by the refrigerant (or refrigerant mixture) in the evaporator per unit volume of refrigerant (or refrigerant mixture) vapor exiting the evaporator (volumetric capacity). The refrigeration capacity is a measure of the ability of a refrigerant (or refrigerant mixture) or heat transfer composition to produce cooling. Therefore, a higher capacity corresponds to a greater cooling power. Cooling rate refers to the heat removed by the refrigerant (or refrigerant mixture) in the evaporator per unit time.

Coefficient of performance (COP) may correspond to the amount of heat removed in the evaporator divided by the energy input required to operate the cycle. A higher COP corresponds to higher energy efficiency. COP is directly related to the energy efficiency ratio (EER), which is the efficiency rating for refrigeration or air conditioning equipment at a specific set of internal and external temperatures.

The term "subcooling" may refer to the reduction of the temperature of a liquid below that liquid's saturation point for a given pressure. The saturation point is the temperature and corresponding pressure at which the vapor is completely condensed to a liquid. Subcooling refers to cooling the liquid to a temperature that is lower than the saturation temperature at a given pressure. By cooling a refrigerant (or refrigerant mixture) liquid below the saturation temperature (or bubble point temperature), the net refrigeration capacity of the refrigerant can be increased. Subcooling may thereby improve the refrigeration capacity and energy efficiency of a system. A subcool amount may refer to the amount of cooling below the saturation temperature for a composition, and is measured in degrees.

Superheat is a term that may describe how far a vapor composition is heated above its saturation vapor temperature (the temperature at which, if the composition is cooled, the first drop of liquid is formed; this temperature is also referred to as the "dew point").

Temperature glide (sometimes referred to simply as "glide") includes the absolute value of the difference between the starting and ending temperatures of a phase-change process by a refrigerant (or refrigerant mixture) within a component of a refrigerant system, exclusive of any subcooling or superheating. This term may be used to describe condensation or evaporation of a near azeotrope or non-azeotropic composition (e.g., refrigerant mixture). When referring to the temperature glide of a refrigeration, air conditioning, or heat pump system, it is common to provide the average temperature glide as being the average of the temperature glide in the evaporator and the temperature glide in the condenser.

The net refrigeration effect may refer to the quantity of heat that a unit, such as a kilogram of refrigerant, absorbs in the evaporator to produce useful cooling.

The mass flow rate may refer to the mass of refrigerant circulating through the refrigeration, heat pump or air conditioning system over a given period of time. The mass flow rate may be measured in mass units (e.g., kilograms) per unit of time.

An azeotropic composition may refer to a constant-boiling mixture of two or more substances that behave as a single substance. One way to characterize an azeotropic composition is that the vapor produced by partial evaporation or distillation of the liquid has the same composition as the liquid from which it is evaporated or distilled. For example, the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation. Additionally, an azeotropic composition will not fractionate upon leakage from a refrigeration or air conditioning system.

An azeotrope-like composition (also commonly referred to as a "near-azeotropic composition") includes a substantially-constant-boiling liquid admixture of two or more substances that behaves essentially as a single substance. One way to characterize an azeotrope-like composition is that the vapor produced by partial evaporation or distillation of the liquid has substantially the same composition as the liquid from which it was evaporated or distilled. For example, the admixture distills/refluxes without substantial composition change. Another way to characterize an azeotrope-like composition is that the bubble point vapor pressure and the dew point vapor pressure of the composition at a particular temperature are substantially the same. Herein, a composition is azeotrope-like if, after 50 weight percent of the composition is removed, such as by evaporation or boiling off, the difference in vapor pressure between the original composition and the composition remaining after 50 weight percent of the original composition has been removed is less than about 10 percent.

A non-azeotropic (also referred to as zeotropic) s composition includes a mixture of two or more substances that behaves as a simple mixture rather than as a single substance. One way to characterize a non-azeotropic composition is that the composition of the vapor produced by partial evaporation or distillation of the liquid is substantially different from the composition of the liquid from which it was evaporated or distilled. For example, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

As used herein, the term "lubricant" may mean any material added to a composition or a compressor (and in contact with any heat transfer composition in use within any heat transfer system) that provides lubrication to the compressor to aid in preventing parts from seizing.

As used herein, compatibilizers include compounds which improve solubility of the hydrofluorocarbon of the disclosed compositions in heat transfer system lubricants. In some examples, the compatibilizers improve oil return to the compressor. Additionally, in examples, the composition is used with a system lubricant to reduce oil-rich phase viscosity.

As used herein, oil-return may refer to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, ultra-violet ("UV") dye includes a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of about 10 nanometers to about 775 nanometers may be detected.

Flammability is a term that may refer to the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in American Society of Testing and Materials ("ASTM") E681-04. The upper flammability limit ("UFL") is the maximum concentration of the heat transfer composition in air that is capable of propagating a flame through a homogeneous mixture of the composition and air under the same test conditions. In order to be classified by American Society of Heating, Refrigerating and Air-Conditioning Engineers ("ASHRAE") as non-flammable, a refrigerant must be non-flammable under the conditions of ASTM E681-04 as formulated in the liquid and vapor phase, as well as non-flammable in both the liquid and vapor phases that result during leakage scenarios.

Global warming potential ("GWP") may refer to an index for estimating the relative global warming contribution of a particular greenhouse gas. The GWP may be measured by comparing the global warming contribution that results from the atmospheric emission of a kilogram of a particular greenhouse gas with the global warming contribution that results from the atmospheric emission of a kilogram of carbon dioxide. GWP can be calculated for different time horizons, thereby showing the effect over the atmospheric lifetime for a given gas. The GWP for the 100 year time horizon is commonly the value referenced. For mixtures, a weighted average can be calculated based on the individual GWPs for each component.

Ozone depletion potential ("ODP") is a number that may refer to the amount of ozone depletion caused by a substance. The ODP includes the ratio of the impact on ozone of a chemical compared to the impact on ozone of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine, which is an ozone-depleting substance.

As used herein, the terms "comprises," "comprising," "includes," "including," "has," "having," or any other variation thereof, are intended to cover a non-exclusive inclusion. For example, a composition, process, method, article, and/or apparatus that comprises a list of elements is not necessarily limited to only those elements, but may include other elements not expressly listed or inherent to such composition, process, method, article, and/or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

The transitional phrase "consisting of" excludes any element, step, or ingredient not specified. If used in a claim, this phrase would close the claim to the inclusion of materials other than those recited, except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method, article, and/or apparatus that includes materials, steps, features, components, and/or elements, in addition to those literally disclosed, provided that these additional materials, steps, features, components, and/or elements do not materially affect the basic and novel characteristic(s) of the claimed invention. The term "consisting essentially of" occupies a middle ground between "comprising" and "consisting of." Typically, components of the refrigerant mixtures and the refrigerant mixtures, themselves, can contain minor amounts (e.g., less than about 0.5 weight percent total) of impurities and/or byproducts (e.g., from the manufacture of the refrigerant components or reclamation of the refrigerant components from other systems) that do not materially affect the novel and basic characteristics of the refrigerant mixture. For example, HFC-134a may contain minor amounts of HFC-134 as a byproduct from the manufacture of HFC-134a. Additionally, HFO-1234ze may be a byproduct of certain processes for producing HFO-1234yf (see e.g., U.S. Publication No.

2009/0278075). However, it is noted that certain embodiments of the present invention may recite HFO-1234ze as a separate component, and in this case, the composition includes HFO-1234ze, whether or not its presence materially affects the novel and basic characteristics of the refrigerant mixture (alone or together with other impurities and/or by-products which by themselves would not materially affect the novel and basic characteristics of the refrigerant mixture).

Where applicants have defined an invention or a portion thereof with an open-ended term such as "comprising," it should be readily understood that, unless otherwise stated, the description should be interpreted to also describe such an invention using the terms "consisting essentially of" or "consisting of."

Also, the articles "a" and/or "an" are employed to describe elements and/or components described herein. This is done merely for convenience and to give a general sense of the scope of the invention. This description should be read to include one, or at least one, of an element and/or component. Furthermore, a singular article, such as "a" and/or "an," also includes the corresponding plural, unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice and/or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and are not intended to be limiting.

2,3,3,3-tetrafluoropropene may also be referred to as HFO-1234yf, HFC-1234yf, or R-1234yf. HFO-1234yf may be made by methods known in the art, such as by dehydrofluorination of 1,1,1,2,3-pentafluoropropane (HFC-245eb) or 1,1,1,2,2-pentafluoropropane (HFC-245cb).

Difluoromethane (HFC-32 or R-32) is commercially available and may be made by methods known in the art, such as by dechlorofluorination of methylene chloride.

Pentafluoroethane (HFC-125 or R-125) is commercially available and may be made by methods known in the art, such as dechlorofluorination of 2,2-dichloro-1,1,1-trifluoroethane, as described in U.S. Pat. No. 5,399,549, incorporated herein by reference.

1,1,1,2-tetrafluoroethane (HFC-134a or R-134a) is commercially available and may be made by methods know in the art, such as by the hydrogenation of 1,1-dichloro-1,2,2,2-tetrafluoroethane (e.g., $CCl_2FCF_3$ or CFC-114a) to 1,1,1,2-tetrafluoroethane.

1,3,3,3-tetrafluoropropene (HFO-1234ze) may be prepared by dehydrofluorination of 1,1,1,2,3-pentafluoropropane (HFC-245eb or $CF_3CHFCH_2F$) or 1,1,1,3,3-pentafluoropropane (HFC-245fa or $CF_3CH_2CHF_2$). The dehydrofluorination reaction may take place in the vapor phase in the presence or absence of catalyst, and also in the liquid phase by reaction with a caustic composition, such as NaOH or KOH. These reactions are described in more detail in U.S. Patent Publication No. 2006/0106263, incorporated herein by reference. HFO-1234ze may exist as one of two configurational isomers, cis- or trans- (also referred to as the E- and Z-isomers, respectively). Trans-HFO-1234ze is available commercially from certain fluorocarbon manufacturers (e.g., Honeywell International Inc., Morristown, N.J.).

Compositions

Described herein are compositions including difluoromethane (HFC-32), pentafluoroethane (HFC-125), 1,1,1,2-tetrafluoroethane (HFC-134a), and 2,3,3,3-tetrafluoropropene (HFO-1234yf). HFO-1234yf and mixtures containing HFO-1234yf are being considered as low GWP replacements for certain refrigerants and refrigerant mixtures that have relatively high GWPs. In particular, R-404A (ASHRAE designation for a mixture containing 44 wt % HFC-125, 52 wt % HFC-143a (1,1,1-trifluoroethane), and 4 wt % HFC-134a) has a GWP of 3922, according to the IPCC Fourth Assessment Report ("AR4"), and will be in need of replacement.

Further, R-507 (ASHRAE designation for a mixture containing 50 wt % HFC-125 and 50 wt % HFC-143a), which has virtually identical properties to R-404A and can therefore be used in many R-404A systems, has a GWP equal to 3985. Thus, R-507 does not provide a lower GWP replacement for R-404A and will be in need of replacement, as well.

Additionally, the refrigerant R-22 (also referred to as HCFC-22) includes chlorodifluoromethane ($CHClF_2$) and has a GWP of 1810. While the GWP of R-22 is lower than that of R-404A and R-507, it is still higher than desired. The ODP of R-22 is also higher than desired. Thus, a replacement refrigerant is needed for R-22.

Other known refrigerants include R-407A, R-407C, and R-407F, having GWPs of 2017, 1774, and 1825, respectively. These refrigerants also have relatively high GWPs and are therefore in need of replacement.

The compositions disclosed herein may be used to replace the refrigerants R-404A, R-507, R-407A, R-407C, R-407F, and/or R-22 in existing refrigeration systems and apparatuses, and may also be used in new refrigeration systems and apparatuses.

Disclosed are non-flammable refrigerant mixtures consisting essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and optionally (e) from about 0.0001 weight percent to 10 weight percent HFO-1234ze. As used herein, unless otherwise noted, the terms "weight percent," "weight %," and "wt %" refer to the ratio, expressed as a percentage, of the weight of one component in a composition and/or mixture to the total weight of the composition and/or mixture. For example, "a composition including 20 weight percent component A" indicates that the weight of component A accounts for 20% of the total weight of the composition.

Also disclosed are non-flammable refrigerant mixtures consisting essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and (e) from about 0.0001 weight percent to 10 weight percent trans-HFO-1234ze.

In another embodiment, the non-flammable refrigerant mixtures may contain from about 0.0001 weight percent to 5 weight percent HFO-1234ze. In another embodiment, the non-flammable refrigerant mixtures contain from about 1 weight percent to 10 weight percent HFO-1234ze. In yet another embodiment, the non-flammable refrigerant mixtures contain from about 1 weight percent to 5 weight percent trans-HFO-1234ze.

In another embodiment, the non-flammable refrigerant mixtures may comprise (a) from 23 weight percent to 25.5 weight percent HFO-1234yf, (b) from 22 weight percent to 24.5 weight percent HFC-32, (c) from 24.5 weight percent to 27 weight percent HFC-125, (d) from 25.5 weight percent to 28 weight percent HFC-134a, and (e) from about 0.0001 weight percent to 5 weight percent trans-HFO-1234ze.

The non-flammable refrigerant mixtures may be azeotrope-like. In particular, the ranges of refrigerant mixtures found to be azeotrope-like include those having from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures also containing trans-HFO-1234ze are found to be azeotrope-like when the mixture includes from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a, and from about 0.0001 weight percent to about 1 weight percent HFO-1234ze.

The non-flammable refrigerant mixtures may contain trans-HFO-1234ze in an amount from about 0.0001 to about 0.1 weight percent.

In some instances, the non-flammable refrigerant mixtures may be azeotrope-like and trans-HFO-1234ze, when present, is present in an amount from about 0.0001 to about 0.1 weight percent.

In further embodiments, a composition may include from 23.3 weight percent to 24.5 weight percent difluoromethane (HFC-32), from 24.5 weight percent to 25.7 weight percent pentafluoroethane (HFC-125), from 25.5 weight percent to 26.7 weight percent 1,1,1,2-tetrafluoroethane (HFC-134a), and from 24.3 weight percent to 25.5 weight percent 2,3,3,3-tetrafluoropropene (HFO-1234yf). Such composition may be included in a refrigerant mixture, such as a non-flammable refrigerant mixture, and may be characterized as azeotrope-like, as described above.

In one particular example, the composition may include 24.3 weight percent difluoromethane (HFC-32), 24.7 weight percent pentafluoroethane (HFC-125), 25.7 weight percent 1,1,1,2-tetrafluoroethane (HFC-134a), and 25.3 weight percent 2,3,3,3-tetrafluoropropene (HFO-1234yf).

In some embodiments, in addition to the tetrafluoropropene, difluoromethane, pentafluoroethane, tetrafluoroethane, the disclosed compositions may comprise optional non-refrigerant components.

In one embodiment, a composition is provided consisting of (i) a non-flammable refrigerant component; and optionally (ii) a non-refrigerant component; wherein the refrigerant component is a non-flammable refrigerant mixture consisting essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and optionally (e) from about 0.0001 weight percent to 10 weight percent trans-HFO-1234ze. In some examples, when the HFO-1234ze is present, it is least about 90% trans-HFO-1234ze or 95% trans-HFO-1234ze. In further examples, the weight ratio of HFC-134a to HFO-1234yf is greater than 1:1. In certain compositions, the HFO-1234yf may be about 25 weight percent of the composition and the HFC-134a may be about 26 weight percent of the composition.

The optional non-refrigerant components (also referred to herein as "additives") in the compositions disclosed herein may include one or more of the following components: lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristics.

In some embodiments, one or more non-refrigerant components are present in small amounts relative to the overall composition. In some embodiments, the concentration of additive(s) in the disclosed compositions ranges from less than about 0.1 weight percent to about 5 weight percent of the total composition. In some embodiments of the present invention, the additives are present in the disclosed compositions in an amount between about 0.1 weight percent to about 5 weight percent of the total composition. In some instances, the amount of additives included in a composition is between about 0.1 weight percent and about 3.5 weight percent of the total composition. The additive component(s) selected for the disclosed composition is selected on the basis of utility, individual equipment components, and/or the system requirements.

In some embodiments, a lubricant included in the composition disclosed herein is a mineral oil lubricant. In some embodiments, the mineral oil lubricant includes, for example, one or more of the following: paraffins (e.g., straight carbon chain saturated hydrocarbons, branched carbon chain saturated hydrocarbons, and mixtures thereof), naphthenes (e.g., saturated cyclic and ring structures), aromatics (e.g., those with unsaturated hydrocarbons containing one or more ring, wherein one or more ring is characterized by alternating carbon-carbon double bonds) and non-hydrocarbons (e.g., those molecules containing atoms such as sulfur, nitrogen, oxygen and mixtures thereof), and mixtures and combinations of thereof, as well as other mineral oil lubricants.

Some embodiments may contain one or more synthetic lubricant. In some embodiments, the synthetic lubricant includes, for example, one or more of the following: alkyl substituted aromatics (e.g., benzene or naphthalene substituted with linear, branched, or mixtures of linear branched alkyl groups, often generically referred to as alkylbenzenes), synthetic paraffins and naphthenes, poly (e.g., alpha olefins), polyglycols (e.g., polyalkylene glycols), dibasic acid esters, polyesters, polyol esters, neopentyl esters, polyvinyl ethers ("PVEs"), perfluoropolyethers ("PFPEs") silicones, silicate esters, fluorinated compounds, phosphate esters, polycarbonates and mixtures of any of the aforementioned lubricants in this paragraph, as well as other synthetic lubricants.

The lubricants as disclosed herein may be commercially available lubricants. For instance, the lubricant may be paraffinic mineral oil, sold by BVA Oils as BVM 100 N; naphthenic mineral oils sold by Crompton Co. under the trademarks Suniso® 1GS, Suniso® 3GS and Suniso® 5GS; naphthenic mineral oil sold by Pennzoil® under the trademark Sontex® 372LT; naphthenic mineral oil sold by Calumet Lubricants under the trademark Calumet® RO-30; linear alkylbenzenes sold by Shrieve Chemicals under the trademarks Zerol® 75, Zerol® 150 and Zerol® 500; and branched alkylbenzene sold by Nippon Oil as HAB 22; polyol esters (POEs) sold under the trademark Castrol® 100 by Castrol; polyalkylene glycols ("PAGs") such as RL-488A from Dow Chemical; perfluoropolyethers ("PFPEs") sold under the trademark Krytox® by E. I. du Pont de Nemours; a product sold under the trademark Fomblin® by Ausimont; or a product sold under the trademark Demnum® by Daikin Industries; and mixtures thereof, meaning mixtures of any of the lubricants disclosed in this paragraph.

The lubricants used with the present invention may be designed for use with hydrofluorocarbon refrigerants and may be miscible with compositions as disclosed herein under operating conditions for compression refrigeration and/or air-conditioning apparatuses. In some embodiments, the lubricants are selected by considering a given compressor's requirements and the environment to which the lubricant will be exposed.

In the compositions of the present invention including a lubricant, the lubricant may be present in an amount of less than 15.0 weight percent of the total composition. The lubricant may further be present in an amount of less than 5.0 weight percent of the total composition. In other embodiments, the amount of lubricant may be between about 0.1 and 3.5 weight percent of the total composition. The lubricant may also be between about 0.1 and 5 weight percent of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning, and heat pump systems, lubricants may be charged in the compressor and/or the compressor lubricant sump. Such lubricant may be in addition to any lubricant additive present in the refrigerant in such a system. In use, the refrigerant composition, when in the compressor, may pick up an amount of the equipment lubricant, thereby changing the refrigerant-lubricant composition from the starting ratio.

In such heat transfer systems, even when the majority of the lubricant resides within the compressor portion of the system, as much as about 75 weight percent to as little as about 1.0 weight percent of the total composition in the entire system may be lubricant. In some systems, such as supermarket refrigerated display cases, for example, the system may contain about 3 weight percent lubricant (over and above any lubricant present in the refrigerant composition prior to charging the system) and about 97 weight percent refrigerant.

The non-refrigerant component used with the compositions of the present invention may include at least one dye. The dye may be at least one UV dye. The UV dye may be a fluorescent dye. The fluorescent dye may include one or more of the following: naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph. The dye may further include other UV dyes.

In some embodiments, the disclosed compositions contain from about 0.001 weight percent to about 1.0 weight percent UV dye. In other embodiments, the UV dye may be present in an amount that ranges from about 0.005 weight percent to about 0.5 weight percent of the total composition. In still other embodiments, the UV dye may be present in an amount that ranges from about 0.01 weight percent to about 0.25 weight percent of the total composition.

UV dye is a useful component for detecting leaks of the composition by permitting one to observe the fluorescence of the dye at and/or in the vicinity of a leak point in an apparatus (e.g., refrigeration unit, air-conditioner, and/or heat pump). The UV emission, e.g., fluorescence from the dye, may be observed under an ultra-violet light. Therefore, if a composition containing such a UV dye is leaking from a given point in an apparatus, the fluorescence can be detected at the leak point and/or in the vicinity of the leak point.

Another non-refrigerant component that may be used with the compositions of the present invention may include at least one solubilizing agent selected to improve the solubility of one or more dyes in the disclosed compositions. In some embodiments, the weight ratio of dye to solubilizing agent ranges from about 99:1 to about 1:1. The solubilizing agents may include at least one of the following compounds: hydrocarbons, hydrocarbon ethers, polyoxyalkylene glycol ethers (e.g., dipropylene glycol dimethyl ether), amides, nitriles, ketones, chlorocarbons (e.g., methylene chloride, trichloroethylene, chloroform, or mixtures thereof), esters, lactones, aromatic ethers, fluoroethers, and 1,1,1-trifluoroalkanes, and mixtures thereof, meaning mixtures of any of the solubilizing agents disclosed in this paragraph. Other solubilizing agents may also be included within the scope hereof.

In some embodiments, the non-refrigerant component comprises at least one compatibilizer to improve the compatibility of one or more lubricants with the disclosed compositions. The compatibilizer may include one or more of the following: hydrocarbons, hydrocarbon ethers, polyoxyalkylene glycol ethers (e.g., dipropylene glycol dimethyl ether), amides, nitriles, ketones, chlorocarbons (e.g., methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph. Other compatibilizers may be also be included.

The solubilizing agent and/or compatibilizer may further include hydrocarbon ethers, which include ethers containing only carbon, hydrogen and oxygen, such as dimethyl ether (DME), and mixtures thereof, meaning mixtures of any of the hydrocarbon ethers disclosed in this paragraph. Other hydrocarbon ethers may be included.

The compatibilizer may be a linear, cyclic, aliphatic, and/or aromatic hydrocarbon compatibilizer containing from 6 to 15 carbon atoms. The compatibilizer may be at least one hydrocarbon, including one or more of the following: hexanes, octanes, nonanes, and decanes, among others. Commercially available hydrocarbon compatibilizers include, but are not limited to, those from ExxonMobil® Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naphtha 140 (a mixture of $C_5$ to $C_{11}$ paraffins, naphthenes, and aromatic hydrocarbons), and mixtures thereof, meaning mixtures of any of the hydrocarbons disclosed in this paragraph. Other hydrocarbons may also be included.

The compatibilizer may, additionally or alternatively, be at least one polymeric compatibilizer. The polymeric compatibilizer may be a random copolymer of fluorinated and non-fluorinated acrylates, wherein the polymer comprises repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group including carbon-chain-based radicals containing C and F, and may further contain H, Cl, ether oxygen, and/or sulfur in the form of thioether, sulfoxide, or sulfone groups, and mixtures thereof. Examples of such polymeric compatibilizers include those commercially available from E. I. du Pont de Nemours and Company, under the trademark Zonyl® PHS. Zonyl® PHS is a random copolymer made by polymerizing 40 weight percent $CH_2=C(CH_3)CO_2CH_2CH_2(CF_2CF_2)_mF$ (also referred to as Zonyl® fluoromethacrylate, or ZFM) wherein m may be from 1 to 12, such as from 2 to 8, and 60 weight percent lauryl methacrylate $(CH_2=C(CH_3)CO_2(CH_2)_{11}CH_3$, also referred to as LMA).

In some embodiments, the compatibilizer component contains from about 0.01 to about 30 weight percent (based on total amount of compatibilizer) of an additive that reduces the surface energy of metallic copper, aluminum, steel, and/or other metals and metal alloys thereof found in heat exchangers. This reduction in surface energy may reduce the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component that may be used with the compositions of the present invention is a metal surface deactivator. The metal surface deactivator may include one or more of the following: areoxalyl bis(benzylidene)hydrazide (CAS Reg. No. 6629-10-3), N,N'-bis(3,5-di-tert-butyl-4-hydroxyhydrocinnamoyl)hydrazine (CAS Reg. No. 32687-78-8), 2,2'-oxamidobis-ethyl-(3,5-di-tert-butyl-4-hydroxyhydrocinnamate) (CAS Reg. No. 70331-94-1), N,N'-(disalicyclidene)-1,2-diaminopropane (CAS Reg. No. 94-91-7), and ethylenediaminetetra-acetic acid (CAS Reg. No. 60-00-4) and its salts, and mixtures thereof, meaning mixtures of any of the metal surface deactivators disclosed in this paragraph. Other metal surface deactivators may also be included.

The non-refrigerant component used with the compositions of the present invention may, additionally or alternatively, be a stabilizer that may include one or more of the following: hindered phenols, thiophosphates, butylated triphenylphosphorothionates, organo phosphates, phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph. Other stabilizers may also be included.

The stabilizer may further include one or more of the following: tocopherol; hydroquinone; t-butyl hydroquinone; monothiophosphates; dithiophosphates, commercially available from Ciba Specialty Chemicals ("Ciba") under the trademark Irgalube® 63; dialkylthiophosphate esters, commercially available from Ciba under the trademarks Irgalube® 353 and Irgalube® 350; butylated triphenylphosphorothionates, commercially available from Ciba under the trademark Irgalube® 232; amine phosphates, commercially available from Ciba under the trademark Irgalube® 349; hindered phosphites, commercially available from Ciba as Irgafos® 168; Tris-(di-tert-butylphenyl)phosphite, commercially available from Ciba under the trademark Irgafos® OPH; Di-n-octyl phosphite; iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; mixed alkyl-aryl phosphates, including isopropylphenyl phosphate (IPPP) and bis(t-butylphenyl) phenyl phosphate (TBPP); butylated triphenyl phosphates, such as those commercially available under the trademark Syn-O-Ad®, including Syn-O-Ad® 8784; tert-butylated triphenyl phosphates, such as those commercially available under the trademark Durad® 620; isopropylated triphenyl phosphates, such as those commercially available under the trademarks Durad® 220 and Durad®110; anisole; 1,4-dimethoxybenzene; 1,4-diethoxybenzene; 1,3,5-trimethoxybenzene; myrcene; alloocimene; limonene (e.g., d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethylhexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3- or 3,4-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802; didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate), commercially available from Ciba under the trademark Tinuvin® 622LD; methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof. Other stabilizers may also be included.

The additive used with the compositions of the present invention may, additionally or alternatively, be an ionic liquid stabilizer. The ionic liquid stabilizer may include one or more of the following: organic salts that are liquid at room temperature (approximately 25° C.); salts containing cations, including pyridinium, pyridazinium, pyrimidinium, pyrazinium, imidazolium, pyrazolium, thiazolium, oxazolium, and triazolium, as well as mixtures thereof; and anions, including $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$$[(CF_3SO_2)_2N]-$, $[(CF_3CF_2SO_2)_2N]-$, $[(CF_3SO_2)_3C]-$$[CF_3CO_2]-$, and F—, as well as mixtures thereof. In some embodiments, ionic liquid stabilizers may include one or more of the following: emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim PF6 (1-butyl-3-methylimidazolium hexafluorophosphate), all of which are available from Fluka™ (Sigma-Aldrich).

In some embodiments, the stabilizer may be a hindered phenol, which includes any substituted phenol compound, including phenols having one or more substituted, cyclic, straight chain, or branched aliphatic substituent group, such as: alkylated monophenols, including 2,6-di-tert-butyl-4-methylphenol, 2,6-di-tert-butyl-4-ethylphenol, 2,4-dimethyl-6-tertbutylphenol, tocopherol, and the like; hydroquinone and alkylated hydroquinones, including t-butyl hydroquinone, other derivatives of hydroquinone, and the like; hydroxylated thiodiphenyl ethers, including 4,4'-thiobis(2-methyl-6-tert-butylphenol), 4,4'-thiobis(3-methyl-6-tertbutylphenol), 2,2'-thiobis(4-methyl-6-tert-butylphenol), and the like; alkylidene-bisphenols, including 4,4'-methylenebis(2,6-di-tert-butylphenol), 4,4'-bis(2,6-di-tert-butylphenol), derivatives of 2,2'- or 4,4-biphenoldiols, 2,2'-methylenebis(4-ethyl-6-tertbutylphenol), 2,2'-methylenebis(4-methyl-6-tertbutylphenol), 4,4-butylidenebis(3-methyl-6-tert-butylphenol), 4,4-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,2- or 4,4-biphenyldiols, including 2,2'-methylenebis(4-ethyl-6-tert-butylphenol); butylated hydroxytoluene (BHT or 2,6-di-tert-butyl-4-methylphenol); bisphenols including heteroatoms, such as 2,6-di-tert-alpha-dimethylamino-p-cresol, 4,4-thiobis(6-tert-butyl-m-cresol), and the like; acylaminophenols; 2,6-di-tert-butyl-4(N,N'-dimethylaminomethylphenol); sulfides, including bis(3-methyl-4-hydroxy-5-tert-butylbenzyl)sulfide, bis(3,5-di-tert-butyl-4-hydroxybenzyl)sulfide; and mixtures thereof, meaning mixtures of any of the phenols disclosed in this paragraph. Other phenols may also be included.

The non-refrigerant component which is used with compositions of the present invention may, additionally or alternatively, include a tracer. The tracer may be two or more tracer compounds from the same class of compounds and/or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Additionally or alternatively, the tracer may be present at a total concentration of about 100 ppm to about 300 ppm.

The tracer may include one or more of the following: hydrofluorocarbons (HFCs), deuterated hydrofluorocarbons, perfluorocarbons, fluoroethers, brominated compounds, iodated compounds, alcohols, aldehydes and ketones, nitrous oxide, and combinations thereof. Additionally or alternatively, the tracer may include one or more of the following: fluoroethane, 1,1,-difluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tetradecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$), and mixtures thereof. In some embodiments, the tracer is a blend containing two or more hydrofluorocarbons, and/or one hydrofluorocarbon in combination with one or more perfluorocarbons. Other tracers may also be included.

The tracer may be added to the compositions of the present invention in predetermined quantities to allow detection of any dilution, contamination, or other alteration of the composition.

The additive which may be used with the compositions of the present invention may, additionally or alternatively, be a perfluoropolyether, as described in detail in U.S. Publication No. 2007/0284555, incorporated herein by reference.

It will be recognized that certain of the additives referenced above as suitable for the non-refrigerant component have been identified as potential refrigerants. However, in accordance with embodiments of this invention, when these additives are used in the non-refrigerant component, they are not present in an amount that would affect the novel and basic characteristics of the refrigerant mixtures of this invention. In embodiments, the non-flammable refrigerant mixtures, as well as the compositions of this invention containing them, contain no more than about 0.5 weight percent of refrigerants other than HFO-1234yf, HFC-32, HFC-125, HFC-134a, and when present, HFO-1234ze.

In one embodiment, the compositions disclosed herein may be prepared by any convenient method to combine the desired amounts of the individual components. In one example, the desired component amounts are weighed and then combined in an appropriate vessel. Agitation may be used, in some instances.

Compositions of the present invention may have zero ozone depletion potential and low GWP. Additionally, the compositions of the present invention may have global warming potentials that are less than many hydrofluorocarbon refrigerants currently in use. In aspects of the present invention, a refrigerant may be provided that has a GWP that is less than 1400 based on the AR4. Other refrigerants provided in accordance with the present invention may have a GWP that is less than 1000, less than 700, less than 500, less than 400, less than 300, less than 150, less than 100, and/or less than 50.

Apparatus, Methods, and Processes of Use

The compositions disclosed herein are useful as heat transfer compositions, such as refrigerants.

Vapor-compression refrigeration systems may include an evaporator, a compressor, a condenser, and an expansion device. A refrigeration cycle may re-use refrigerant in multiple steps to produce a cooling effect in one step and a heating effect in a different step. An exemplary cycle can be described simply as follows. Liquid refrigerant may enter an evaporator through an expansion device, and the liquid refrigerant may boil at a low temperature in the evaporator by withdrawing heat from the environment, thereby forming a gas and producing cooling. Air or a heat transfer fluid may flow over and/or around the evaporator to transfer the cooling effect caused by the evaporation of the refrigerant in the evaporator to a body to be cooled. The low-pressure gas may enter a compressor, where the gas is compressed to raise its pressure and temperature. The higher-pressure (compressed) gaseous refrigerant may then enter the condenser in which the refrigerant condenses and discharges its heat to the environment. The refrigerant may return to the expansion device through which the liquid expands from the higher-pressure level in the condenser to the lower-pressure level in the evaporator, thus repeating the cycle.

In one embodiment, a process for producing cooling includes condensing a refrigerant mixture as disclosed herein and thereafter evaporating said composition in the vicinity of a body to be cooled.

A body to be cooled may be defined as any space, location, object, and/or body that is desired to be cooled. Examples include spaces (open or enclosed) requiring refrigeration or cooling, such as refrigerator and/or freezer cases in a supermarket.

By "vicinity," it is meant that the evaporator of the system containing the refrigerant mixture may be located either within and/or adjacent to the body to be cooled, such that air moving over the evaporator would move into and/or around the body to be cooled.

Non-flammable refrigerant mixtures useful in the process for producing cooling may consist essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and optionally (e) from about 0.0001 weight percent to 10 weight percent HFO-1234ze.

In another embodiment, non-flammable refrigerant mixtures useful in the process for producing cooling may consist essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and (e) from about 0.0001 weight percent to 10 weight percent trans-HFO-1234ze.

Additionally, non-flammable refrigerant mixtures useful in the process for producing cooling may contain from about 0.0001 weight percent to 5 weight percent HFO-1234ze. In other aspects, the non-flammable refrigerant mixtures may contain from about 1 weight percent to 10 weight percent HFO-1234ze. In yet another embodiment, the non-flammable refrigerant mixtures contain from about 1 weight percent to 5 weight percent trans-HFO-1234ze.

The non-flammable refrigerant mixtures useful in the process for producing cooling may, in embodiments, include (a) from 23 weight percent to 25.5 weight percent HFO-1234yf, (b) from 22 weight percent to 24.5 weight percent HFC-32, (c) from 24.5 weight percent to 27 weight percent HFC-125, (d) from 25.5 weight percent to 28 weight percent HFC-134a, and (e) from about 0.0001 weight percent to 5 weight percent trans-HFO-1234ze.

In another embodiment, the non-flammable refrigerant mixtures useful in the process for producing cooling may be azeotrope-like. In particular, the ranges of refrigerant mixtures found to be azeotrope-like include those having from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Refrigerant mixtures that also contain trans-HFO-1234ze are found to be azeotrope-like when the mixture includes, for example, from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a, and from about 0.0001 weight percent to about 1 weight percent HFO-1234ze.

The non-flammable refrigerant mixtures useful in the process for producing cooling may contain trans-HFO-1234ze in an amount from about 0.0001 to about 0.1 weight percent. Additionally, the non-flammable refrigerant mixtures useful in the process for producing cooling may be azeotrope-like, and trans-HFO-1234ze, when present, may be present in an amount from about 0.0001 to about 0.1 weight percent.

In embodiments, a composition, such as a non-flammable refrigerant mixture that is useful in the process for cooling, may include from 23.3 weight percent to 24.5 weight percent difluoromethane (HFC-32), from 24.5 weight percent to 25.7 weight percent pentafluoroethane (HFC-125), from 25.5 weight percent to 26.7 weight percent 1,1,1,2-tetrafluoroethane (HFC-134a), and from 24.3 weight percent to 25.5 weight percent 2,3,3,3-tetrafluoropropene (HFO-1234yf). Such composition may be included in a refrigerant mixture, such as a non-flammable refrigerant mixture, and may be characterized as azeotrope-like, as described above.

In one particular example, a non-flammable refrigerant mixture that is useful in the process for cooling may include 24.3 weight percent difluoromethane (HFC-32), 24.7 weight percent pentafluoroethane (HFC-125), 25.7 weight percent 1,1,1,2-tetrafluoroethane (HFC-134a), and 25.3 weight percent 2,3,3,3-tetrafluoropropene (HFO-1234yf).

In some embodiments, the refrigerant mixtures as disclosed herein may be useful in refrigeration applications including medium or low temperature refrigeration. Medium temperature refrigeration systems includes supermarket and convenience store refrigerated cases, such as cases for beverages, dairy, fresh food, and other refrigerated items. Medium temperature refrigeration systems may also include fresh food transport systems. Low temperature refrigeration systems include supermarket and convenience store freezer cabinets and displays, ice machines, and frozen food transport systems. Other specific uses may be in commercial, industrial, and/or residential refrigerators and freezers, ice machines, self-contained coolers and freezers, supermarket rack and distributed systems, walk-in and reach-in coolers and freezers, and combination systems.

Additionally, in some embodiments, the disclosed compositions may function as primary refrigerants in secondary loop systems that provide cooling to remote locations by use of a secondary heat transfer fluid, which may comprise water, a glycol, carbon dioxide, and/or a fluorinated hydrocarbon fluid. In this case the secondary heat transfer fluid is the body to be cooled, as the secondary fluid is adjacent to the evaporator and is cooled before moving to a remote body to be cooled.

The compositions disclosed herein may be useful as low GWP replacements for currently used refrigerants, including R-404A (ASHRAE designation for a blend of 44 weight percent R-125, 52 weight percent R-143a (1,1,1-trifluoroethane), and 4.0 weight percent R-134a) and R-507 (ASHRAE designation for a blend of 50 weight percent R-125 and 50 weight percent R-143a). Additionally, the compositions included herein may be useful as a low GWP replacement for R-22 (also referred to as HCFC-22), which includes chlorodifluoromethane. These compositions may also be useful as a low GWP replacement for R-407A, R-407C, and/or R-407F.

Replacement refrigerants may be especially useful if they can be used in existing refrigeration equipment that was originally designed for a different refrigerant. The compositions as disclosed herein may be useful as replacements for R-404A, R-507, R-407A, R-407C, R-407F, and R-22 in equipment designed for R-404A, R507, R-407A, R-407C, R-407F, and R-22 refrigerants, respectively. For example, the compositions described above may be used as refrigerants in systems and/or apparatuses that were designed for use with the refrigerant R-22. Similarly, the compositions disclosed herein may be useful as replacements for R-407A, R-407C, and R-407F in equipment designed for R-407A, R-407C, and R-407F. In some aspects, the compositions disclosed herein may be substituted for these known refrigerants without needing to modify the existing equipment designed for use with these known refrigerants. In other aspects, the equipment may be modified to optimize the performance of the compositions disclosed herein. Additionally, the compositions disclosed herein may be used in new systems. In embodiments, such new systems may be designed specifically for the compositions disclosed herein.

The disclosed compositions may be useful as refrigerants and may provide at least comparable cooling performance (e.g., cooling capacity and energy efficiency) to the cooling performance provided by refrigerants such as R-404A, R-507, R-407A, R-407C, R-407F, and R-22.

In embodiments, a method is provided for replacing a refrigerant selected from the group consisting of R-404A and R-507. Additionally or alternatively, the refrigerant selected for replacement may include R-407A, R-407C, R-407F, and/or R-22. The method may include charging a refrigeration apparatus with a refrigerant mixture comprising HFO-1234yf, HFC-32, HFC-125, HFC-134a, and optionally HFO-1234ze as described herein. The refrigeration apparatus may be suitable for use with R-404A and/or R-507. Additionally or alternatively, the refrigeration apparatus may be suitable for use with R-22. The refrigeration apparatus may also be suitable for use with R-407A, R-407C, and/or R-407F. The refrigeration apparatus may include systems with evaporating temperatures that range from about −40° C. to about 0° C. In particular, the refrigeration apparatus may include systems with evaporating temperatures that range from about −40° C. to about −20° C. Additionally or alternatively, the refrigeration apparatus may include systems with evaporating temperatures that range from about −20° C. to about 0° C.

Non-flammable refrigerant mixtures useful in the method for replacing a refrigerant may consist essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and optionally (e) from about 0.0001 weight percent to 10 weight percent HFO-1234ze.

In another embodiment, non-flammable refrigerant mixtures useful in the method for replacing a refrigerant consist essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and (e) from about 0.0001 weight percent to 10 weight percent trans-HFO-1234ze.

In another embodiment, the non-flammable refrigerant mixtures useful in the method for replacing a refrigerant may contain from about 0.0001 weight percent to 5 weight percent HFO-1234ze. In another embodiment, the non-flammable refrigerant mixtures may contain from about 1 weight percent to 10 weight percent HFO-1234ze. In yet another embodiment, the non-flammable refrigerant mixtures may contain from about 1 weight percent to 5 weight percent trans-HFO-1234ze.

Non-flammable refrigerant mixtures useful in the method for replacing a refrigerant may also comprise (a) from 23 weight percent to 25.5 weight percent HFO-1234yf, (b) from 22 weight percent to 24.5 weight percent HFC-32, (c) from 24.5 weight percent to 27 weight percent HFC-125, (d) from 25.5 weight percent to 28 weight percent HFC-134a, and (e) from about 0.0001 weight percent to 5 weight percent trans-HFO-1234ze.

The non-flammable refrigerant mixtures useful in the method for replacing a refrigerant may be azeotrope-like. In particular, the ranges of refrigerant mixtures found to be azeotrope-like include those having from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures that also contain trans-HFO-1234ze are found to be azeotrope-like when the mixture includes from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a, and from about 0.0001 weight percent to about 1 weight percent HFO-1234ze.

The non-flammable refrigerant mixtures useful in the method for replacing a refrigerant may contain trans-HFO-1234ze in an amount that ranges from about 0.0001 to about 0.1 weight percent.

Non-flammable refrigerant mixtures useful in the method for replacing a refrigerant may be azeotrope-like, and if the mixture includes trans-HFO-1234ze, HFO-1234ze may be present in an amount that ranges from about 0.0001 to about 0.1 weight percent.

In embodiments, a composition, such as a non-flammable refrigerant mixture that is useful in the method for replacing a refrigerant, may include from 23.3 weight percent to 24.5 weight percent difluoromethane (HFC-32), from 24.5 weight percent to 25.7 weight percent pentafluoroethane (HFC-125), from 25.5 weight percent to 26.7 weight percent 1,1,1,2-tetrafluoroethane (HFC-134a), and from 24.3 weight percent to 25.5 weight percent 2,3,3,3-tetrafluoropropene (HFO-1234yf). Such compositions may be included in a refrigerant mixture, such as a non-flammable refrigerant mixture that is useful in the method for replacing a refrigerant, and may be characterized as azeotrope-like, as described above. In particular, the method for replacing a refrigerant may include a method for replacing the refrigerant R-22 in a heat transfer system that was designed for use with the R-22 refrigerant or a similar refrigerant. The method for replacing a refrigerant may also include a method for replacing the refrigerants R-407A, R-407C, and/or R-407F in a heat transfer system that was designed for use with the refrigerants R-407A, R-407C, and/or R-407F. The method may include the step of charging the heat transfer system with the composition described immediately above. Notably, a heat transfer system that is currently using R-22 may be immediately transitioned to use with this composition. In other words, an intermediary, such as a refrigerant like R-404A need not be utilized to make the transition. Similarly, a heat transfer system that is currently using R-407A, R-407C, and/or R-407F may be immediately transitioned to use with a composition of the present invention.

In one particular example, a non-flammable refrigerant mixture that is useful in the method for replacing a refrigerant, such as R-22, R-407A, R-407C, and/or R-407F, may include 24.3 weight percent difluoromethane (HFC-32), 24.7 weight percent pentafluoroethane (HFC-125), 25.7 weight percent 1,1,1,2-tetrafluoroethane (HFC-134a), and 25.3 weight percent 2,3,3,3-tetrafluoropropene (HFO-1234yf). Thus, a method for replacing R-22, R-407A, R-407C, and/or R-407F in a heat transfer system that was designed for R-22, R-407A, R-407C, and/or R-407F, respectively, may include charging the heat transfer system with the composition described immediately above. As mentioned, a system designed for use with R-22, R-407A, R-407C, R-407F, and/or a similar refrigerant may be immediately transitioned to use with one of the compositions of the present invention. The composition used in the method for replacing a refrigerant, such as any of the compositions discussed above, may further include a non-refrigerant component.

The method for replacing an existing refrigerant, such as R-404A, R-507, R-407A, R-407C, R-407F, and/or R-22, may further include evaporating the composition used to replace the existing refrigerant at an evaporator of the heat transfer system. The evaporator may operate at a medium temperature. A medium evaporator temperature may include temperatures in the range from −20° C. to 0° C. Such an evaporator may be included in a heat transfer system for a refrigerated food display, such as a produce display at a grocery store. In some instances, when the composition is used in a heat transfer system that includes an evaporator operating at a medium temperature, the composition has a refrigeration capacity that is within 7% of the refrigeration capacity that results from using R-22 as the refrigerant in the heat transfer system when the evaporator operates at a medium temperature.

The method may also include compressing the composition that replaces the existing refrigerant at a compressor of the heat transfer system. The compressor may be associated with a discharge temperature that is lower than a discharge temperature that results from using R-22 as the refrigerant in the heat transfer system. For example, the system may initially be charged with R-22, and the compressor may be associated with a certain discharge temperature. When R-22 is replaced by one of the compositions described herein, the discharge temperature of compressor may be lower than the discharge temperature associated with the use of R-22. This will be discussed in more detail in the examples below.

Another embodiment provides a method for recharging a heat transfer system that contains both a refrigerant to be replaced and a lubricant. The method may include removing the refrigerant to be replaced from the heat transfer system while retaining a substantial portion of the lubricant in said system and introducing one of the compositions herein disclosed to the heat transfer system.

In another embodiment, a heat exchange system that includes a composition disclosed herein is provided, wherein said system is selected from a group that includes freezers, refrigerators, walk-in coolers, supermarket refrigeration and/or freezer systems, mobile refrigerators, and systems having combinations thereof.

In one embodiment, there is provided a heat transfer system containing a composition as disclosed herein. For example, a refrigeration apparatus, such as a mobile and/or stationary refrigeration apparatus, may contain a composition as disclosed herein. In particular, a medium temperature refrigeration apparatus may contain a composition disclosed herein. In another embodiment, a low temperature refrigeration apparatus may contain a composition disclosed herein. The heat transfer system and/or refrigeration apparatus may include an evaporator, a compressor, a condenser, and an expansion device.

Non-flammable refrigerant mixtures useful in the heat exchange systems, heat transfer systems, and/or refrigeration apparatuses may consist essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and optionally (e) from about 0.0001 weight percent to 10 weight percent HFO-1234ze.

In another embodiment, non-flammable refrigerant mixtures useful in the heat exchange systems, heat transfer systems, and/or refrigeration apparatuses may consist essentially of (a) from 20 weight percent to 25.5 weight percent HFO-1234yf, (b) from 20 weight percent to 24.5 weight percent HFC-32, (c) from 24.5 weight percent to 30 weight percent HFC-125, (d) from 25.5 weight percent to 30 weight percent HFC-134a, and (e) from about 0.0001 weight percent to 10 weight percent trans-HFO-1234ze.

The non-flammable refrigerant mixtures useful in the heat exchange systems, heat transfer systems, and/or refrigeration apparatuses may contain from about 0.0001 weight percent to 5 weight percent HFO-1234ze. In another embodiment, the non-flammable refrigerant mixtures may contain from about 1 weight percent to 10 weight percent HFO-1234ze. In yet another embodiment, the non-flammable refrigerant mixtures may contain from about 1 weight percent to 5 weight percent trans-HFO-1234ze.

Additionally, the non-flammable refrigerant mixtures useful in the heat exchange systems, heat transfer systems, and/or refrigeration apparatuses comprise (a) from 23 weight percent to 25.5 weight percent HFO-1234yf, (b) from 22 weight percent to 24.5 weight percent HFC-32, (c) from 24.5 weight percent to 27 weight percent HFC-125, (d) from 25.5 weight percent to 28 weight percent HFC-134a, and (e) from about 0.0001 weight percent to 5 weight percent trans-HFO-1234ze.

In another embodiment, the non-flammable refrigerant mixtures useful in the heat exchange systems, heat transfer systems, and/or refrigeration apparatuses may be azeotrope-like. In particular, the ranges of refrigerant mixtures found to be azeotrope-like include those having from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures that also contain trans-HFO-1234ze are found to be azeotrope-like when the mixtures include from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a, and from about 0.0001 weight percent to about 1 weight percent HFO-1234ze.

In another embodiment, the non-flammable refrigerant mixtures useful in the heat exchange systems, heat transfer systems, and/or refrigeration apparatuses contain trans-HFO-1234ze from about 0.0001 to about 0.1 weight percent. The non-flammable refrigerant mixtures useful in the heat exchange systems, heat transfer systems, and/or refrigeration apparatuses may be azeotrope-like and include trans-HFO-1234ze, wherein when HFO-1234ze is present, it is present in an amount from about 0.0001 to about 0.1 weight percent.

In further embodiments, a composition, such as a non-flammable refrigerant mixture that is useful in heat exchange systems, heat transfer systems, and/or refrigeration apparatuses, may include from 23.3 weight percent to 24.5 weight percent difluoromethane (HFC-32), from 24.5 weight percent to 25.7 weight percent pentafluoroethane (HFC-125), from 25.5 weight percent to 26.7 weight percent 1,1,1,2-tetrafluoroethane (HFC-134a), and from 24.3 weight percent to 25.5 weight percent 2,3,3,3-tetrafluoropropene (HFO-1234yf). In one particular example, the composition may include 24.3 weight percent difluoromethane (HFC-32), 24.7 weight percent pentafluoroethane (HFC-125), 25.7 weight percent 1,1,1,2-tetrafluoroethane (HFC-134a), and 25.3 weight percent 2,3,3,3-tetrafluoropropene (HFO-1234yf). Such compositions may be included in a refrigerant mixture, such as a non-flammable refrigerant mixture, and may be characterized as azeotrope-like, as described above.

The heat exchange system, heat transfer system, and/or refrigeration apparatus may have been designed for use with the refrigerant R-22. For example, the system and/or apparatus may include an expansion device designed for use with the refrigerant R-22. If the system and/or apparatus was previously used with R-22, the R-22 refrigerant may be removed and replaced with one of the compositions disclosed herein. Similarly, the heat exchange system, heat transfer system, and/or refrigeration apparatus may have been designed for use with the refrigerants R-407A, R-407C, and/or R-407F, or previously retrofitted from R-22 to R-407A, R-407C, and/or R-407F. For example, the system and/or apparatus may include an expansion device designed for use with the refrigerant R-407A, R-407C, and/or R-407F. If the system and/or apparatus was previously used with R-407A, R-407C, and/or R-407F, the R-407A, R-407C, and/or R-407F may be removed and replaced with one of the compositions disclosed herein.

The system and/or apparatus may, as mentioned, include a compressor. When the system and/or apparatus is charged with one of the compositions disclosed herein, as opposed to with R-22, the discharge temperature of the compressor may be lower than a discharge temperature that results at the compressor when the system and/or apparatus is charged with R-22.

EXAMPLES

The concepts disclosed herein will be further described in the following examples, which do not limit the scope of the invention described in the claims.

Example 1

Impact of Vapor Leakage

A vessel is charged to 90% full with an initial composition at the indicated temperature, and the initial vapor pressure of the composition is measured. The composition is allowed to leak from the vessel, while the temperature is held constant, until 50 weight percent of the initial composition is removed, at which time the vapor pressure of the composition remaining in the vessel is measured. Vapor pressure changes are listed in Table 1.

TABLE 1

| Composition wt % | Initial P (Psia) | Initial P (kPa) | After 50% Leak (Psia) | After 50% Leak (kPa) | Delta P (%) |
|---|---|---|---|---|---|
| HFO-1234yf/HFC-32/HFC-125/HFC-134a (at 25° C.) | | | | | |
| 25/24/25/26 | 182.4 | 1258 | 165.6 | 1142 | 9.2% |
| 25.3/24.3/24.7/25.7 | 183.2 | 1263 | 166.6 | 1149 | 9.1% |
| 20/20/30/30 | 176.9 | 1220 | 160.7 | 1108 | 9.2% |
| 25.5/24.5/24.5/25.5 | 183.2 | 1263 | 166.3 | 1147 | 9.2% |
| 25/22/26/27 | 179.2 | 1236 | 162.3 | 1119 | 9.4% |
| 23/22/27/28 | 179.4 | 1237 | 162.8 | 1122 | 9.3% |
| HFO-1234yf/HFC-32/HFC-125/HFC-134a/trans-HFO-1234ze (at 25° C.) | | | | | |
| 24.9999/24/25/26/0.0001 | 182.4 | 1258 | 165.6 | 1142 | 9.2% |
| 24.999/24/25/26/0.001 | 182.4 | 1258 | 165.6 | 1142 | 9.2% |
| 24.99/24/25/26/0.01 | 182.4 | 1258 | 165.5 | 1141 | 9.3% |

TABLE 1-continued

| Composition wt % | Initial P (Psia) | Initial P (kPa) | After 50% Leak (Psia) | After 50% Leak (kPa) | Delta P (%) |
|---|---|---|---|---|---|
| 24.9/24/25/26/0.1 | 182.2 | 1256 | 165.2 | 1139 | 9.3% |
| 24/24/25/26/1 | 181.1 | 1249 | 163.5 | 1127 | 9.7% |
| Comparative | | | | | |
| HFO-1234yf/HFC-32/HFC-125/HFC-134a (at 25° C.) | | | | | |
| 45/10/10/35 | 141.1 | 973 | 125.5 | 865 | 11.1% |
| 50/10/20/20 | 150.9 | 1040 | 134.0 | 924 | 11.2% |
| 40/15/10/35 | 153.2 | 1056 | 134.9 | 930 | 11.9% |
| 30/15/20/35 | 159.4 | 1099 | 142.2 | 980 | 10.8% |

The compositions as defined by the present invention are found to be azeotrope-like with less than 10% change in the vapor pressure after 50% of the composition is leaked.

Example 2

Flammability

Flammable mixtures may be identified by testing under ASTM (American Society of Testing and Materials) E681-04, with an electronic ignition source. Such tests of flammability were conducted on refrigerant mixtures at 50 percent relative humidity.

In order to determine a flammability boundary, the flammability of two refrigerant mixtures was determined for both the liquid and vapor phases at −36° C. (10 degrees above the bubble point, as designated in ASHRAE Standard 34) for a container that is 90% liquid filled. The compositions contained HFO-1234yf/HFC-32/HFC-125/HFC-134a at the concentrations given in the Table 2.

TABLE 2

| Liquid phase (wt %) | | Vapor phase (wt %) | |
|---|---|---|---|
| 25.5/24.5/24.5/25.5 | Non-flammable | 18/40/30/12 | Non-flammable |
| 25.5/25.5/23.5/25.5 | Non-flammable | 18/41/29/12 | Flammable |

Based on the data above in Table 2, compositions with more than about 24.5 weight percent HFC-32 and less than about 24.5 weight percent HFC-125 would be classified as flammable refrigerants.

Additional vapor leak analysis and flammability testing has been conducted to determine whether the compositions disclosed herein meet the requirements for ASHRAE Class 1 non-flammability under ASHRAE Standard 34-2013, entitled "Designation and Safety Classification of Refrigerants." In accordance with these standards, nominal formulations for a composition are developed. Manufacturing tolerances are then assigned to account for variances in manufacturing. Compositions including the nominal formulation and compositions falling within the ranges defined by the manufacturing tolerances are analyzed in accordance with embodiments of the present invention. These compositions are set forth in Table 2.1 below.

TABLE 2.1

| Component | Nominal Composition (Weight %) | Manufacturing Tolerances (Weight %) | Range based on Manufacturing Tolerances (Weight %) |
|---|---|---|---|
| R-32 | 24.3 | +0.2/−1.0 | 23.3-24.5 |
| R-125 | 24.7 | +1.0/−0.2 | 24.5-25.7 |
| R-134a | 25.7 | +1.0/−0.2 | 25.5-26.7 |
| R-1234yf | 25.3 | +0.2/−1.0 | 24.3-25.5 |

After manufacturing tolerances are selected, the worst case formulation (WCF) is selected. This represents the formulation that could be most flammable based on manufacturing tolerances. The WCF is then modeled for vapor leakage of the refrigerant using NIST Refleak 3.2 at worst case conditions for several ASHRAE Standard 34 leak scenarios. Based on this modeling, the worst case fractionated formulation (WCFF) is identified, where the WCFF corresponds to the scenario in which the highest concentration of flammable components is observed in either the refrigerant liquid phase or refrigerant vapor phase. For the compositions of the present invention, as well as the compositions selected for comparative purposes, the WCFF was determined to be the initial vapor composition at 10° C. above the bubble point temperature when a cylinder is initially filled to 90% full with the composition at an initial temperature of 54.4° C. The WCFF compositions are then tested for flammability according to ASTM E681-04 at 60° C. and 50% relative humidity, in accordance with ASHRAE standards. When ignition occurs, the flame angle for the WCFF in a spherical 12 liter flask must exhibit an arc of less than 90° in order for the composition to be considered non-flammable. Table 2.2 includes test results for an exemplary embodiment of a composition in accordance with the present invention. These results are provided in the table for the "Ex. Embodiment." Table 2.2 also includes two comparative examples, which are expected to be flammable based on the amount of R-32, a flammable component, present in the compositions having the formulae set forth in comparative examples (C) and (D). For example, the WCFF scenarios for comparative example (C) ("Comparative (C)") include 40.2 and 40.4 weight percent of R-32. The WCFF scenarios for comparative example (D) ("Comparative (D)") include even higher amounts of R-32. Based on these levels of R-32, it is expected that test results for comparative examples (C) and (D) will have increased potential for flammability. It should be noted that the comparative examples (C) and (D) are prophetic examples, and that the results accompanied by an asterisk (*) are expected results. Testing has not yet been conducted.

TABLE 2.2

| Composition | R-32/-125/-134a/-1234yf (Weight %) | Composition Type | Ignition Flame Angle | Flammable |
|---|---|---|---|---|
| Ex. Embodiment | 24.3/24.7/25.7/25.3 | Nominal | | |
| | 24.5/24.5/25.5/25.5 | WCF | | |
| | 39.8/30.0/11.9/18.3 | WCFF based on WCF at −36.0° C., 90% fill | 70° | No |
| Comparative (C) | 25/25/25/25 | Nominal | | |
| | 40.2/30.4/11.5/17.9 | WCFF based on nominal composition at −36.2° C., 90% fill | >90°* | Yes* |
| | 25.2/24.8/24.8/25.2 | WCF | | |
| | 40.4/30.1/11.4/18.0 | WCFF based on WCF at −36.2° C., 90% fill | >90°* | Yes* |
| Comparative (D) | 25/25/20/30 | Nominal | | |
| | 40.5/29.6/9.1/20.8 | WCFF based on nominal composition at −36.6° C., 90% fill | >90°* | Yes* |
| | 25.2/24.8/19.8/30.2 | WCF | | |
| | 40.7/29.5/9.0/20.8 | WCFF based on WCF at −36.6° C., 90% fill | >90°* | Yes* |

As shown above, the Exemplary Embodiment, which is in accordance with an embodiment of the present invention, is non-flammable under ASHRAE Standard 34 guidelines. By contrast, comparative examples (C) and (D) are expected to be flammable and, therefore, are expected to fail the ASHRAE Class 1 non-flammable criteria.

Example 3

Refrigeration Performance

Table 3 shows the performance of some exemplary compositions as compared to R-404A. In Table 3, Evap Temp is evaporator temperature, Evap Pres is evaporator pressure, Cond Pres is condenser pressure, Compr Exit Temp is compressor exit temperature (also sometimes called compressor discharge temperature), COP is coefficient of performance (analogous to energy efficiency), and CAP is volumetric cooling capacity. The data are based on the following conditions.

| Condenser temperature | 40° C. |
|---|---|
| Subcool amount | 10 K |
| Compressor efficiency | 75% |

TABLE 3

| | wt % | Evap Temp (° C.) | Return Gas Temp (° C.) | Evap Pressure (kPa) | Cond Pressure (kPa) | Compr Exit Temp (° C.) | COP | Capacity (kJ/m3) | COP Rel to R-404A | Cap Rel to R-404A |
|---|---|---|---|---|---|---|---|---|---|---|
| R-404A | 100 | −40 | −20 | 134 | 1833 | 88 | 1.48 | 751 | 100% | 100% |
| 32/125/134a/1234yf | 24/25/26/25 | −40 | −20 | 111 | 1736 | 110 | 1.53 | 707 | 104% | 94% |
| 32/125/134a/1234yf/t-1234ze | 24/25/26/24.9/0.1 | −40 | −20 | 111 | 1736 | 110 | 1.53 | 706 | 104% | 94% |
| 32/125/134a/1234yf/t-1234ze | 24/25/26/20/5 | −40 | −20 | 107 | 1718 | 111 | 1.53 | 695 | 104% | 92% |
| R-404A | 100 | −25 | −5 | 251 | 1833 | 80 | 2.11 | 1478 | 100% | 100% |
| 32/125/134a/1234yf | 24/25/26/25 | −25 | −5 | 215 | 1736 | 96 | 2.17 | 1416 | 103% | 96% |
| 32/125/134a/1234yf/t-1234ze | 24/25/26/24.9/0.1 | −25 | −5 | 215 | 1736 | 96 | 2.17 | 1415 | 103% | 96% |
| 32/125/134a/1234yf/t-1234ze | 24/25/26/20/5 | −25 | −5 | 211 | 1718 | 97 | 2.17 | 1397 | 103% | 95% |
| R-404A | 100 | −15 | 5 | 365 | 1833 | 76 | 2.74 | 2221 | 100% | 100% |
| 32/125/134a/1234yf | 24/25/26/25 | −15 | 5 | 320 | 1736 | 89 | 2.80 | 2145 | 102% | 97% |
| 32/125/134a/1234yf/t-1234ze | 24/25/26/24.9/0.1 | −15 | 5 | 320 | 1736 | 89 | 2.80 | 2145 | 102% | 97% |
| 32/125/134a/1234yf/t-1234ze | 24/25/26/20/5 | −15 | 5 | 314 | 1718 | 89 | 2.80 | 2121 | 102% | 95% |
| R-404A | 100 | −5 | 15 | 516 | 1833 | 72 | 3.66 | 3244 | 100% | 100% |
| 32/125/134a/1234yf | 24/25/26/25 | −5 | 15 | 460 | 1736 | 83 | 3.72 | 3152 | 101% | 97% |
| 32/125/134a/1234yf/t-1234ze | 24/25/26/24.9/0.1 | −5 | 15 | 460 | 1736 | 83 | 3.72 | 3151 | 101% | 97% |
| 32/125/134a/1234yf/t-1234ze | 24/25/26/20/5 | −5 | 15 | 453 | 1718 | 83 | 3.72 | 3119 | 101% | 96% |

Results show compositions of the present invention exhibit cooling capacity which is comparable to R-404A which also demonstrates these compositions may be suitable to retrofit an existing R-404A system or be useful in new refrigeration systems. The compositions also exhibit higher energy efficiency than R-404A.

Example 4

Refrigeration Performance

Table 4 shows the performance of some exemplary compositions as compared to R-404A and comparative examples (A) and (B). In Table 4, Evap Pres is evaporator pressure, Cond Pres is condenser pressure, Compr Exit Temp is compressor exit temperature (also sometimes called compressor discharge temperature), COP is coefficient of performance (analogous to energy efficiency), and CAP is volumetric cooling capacity. The data are based on the following conditions.

| | |
|---|---|
| Evaporator temperature | −10° C. |
| Return Gas temperature | 10° C. |
| Condenser temperature | 40° C. |
| Subcool amount | 10 K |
| Compressor efficiency | 75% |

Results show that the compositions of the present invention provide improved energy efficiency relative to R-404A. Additionally, the compositions of the present invention provide cooling capacity within only a few percent of that for R-404A. Note that comparative example (B) falls well short of the cooling capacity of the other compositions. Also note that comparative example (A) while providing similar cooling performance, shows a higher compressor exit temperature. Higher compressor temperatures are expected to reduce compressor life, thus increasing the cost of operation of a system.

Example 5

Refrigeration Performance

Examples 5-7 include performance data for an exemplary embodiment of a composition in accordance with the present invention. In particular, the exemplary embodiment ("Ex. Embodiment") described in these examples and corresponding tables is a composition including 24.3 weight percent difluoromethane (HFC-32), 24.7 weight percent pentafluoroethane (HFC-125), 25.7 weight percent 1,1,1,2-tetrafluo

TABLE 4

| | wt % | Evap Pressure (kPa) | Cond Pressure (kPa) | Compr Exit Temp (° C.) | COP | Capacity (kJ/m3) | COP Rel to R-404A | Cap Rel to R-404A |
|---|---|---|---|---|---|---|---|---|
| R-404A | 100 | 436 | 1833 | 74 | 3.16 | 2694 | 100% | 100% |
| 32/125/134a/1234yf | 24/25/26/25 | 387 | 1741 | 85 | 3.22 | 2628 | 102% | 98% |
| 32/125/134a/1234yf/t-1234ze | 24/25/26/24.9/0.1 | 387 | 1740 | 85 | 3.22 | 2627 | 102% | 98% |
| 32/125/134a/1234yf/t-1234ze | 24/25/26/20/5 | 378 | 1713 | 86 | 3.23 | 2587 | 102% | 96% |
| 32/125/134a/1234yf/t-1234ze | 24/25/26/24/1 | 385 | 1735 | 85 | 3.22 | 2620 | 102% | 97% |
| 32/125/134a/1234yf/t-1234ze | 25/26/20/24/5 | 391 | 1755 | 86 | 3.22 | 2648 | 102% | 98% |
| 32/125/134a/1234yf/t-1234ze | 20/30/25.5/20.5/4 | 371 | 1685 | 83 | 3.23 | 2533 | 102% | 94% |
| 32/125/134a/1234yf/t-1234ze | 22/26/28/23/1 | 376 | 1702 | 84 | 3.23 | 2566 | 102% | 95% |
| Comparative | | | | | | | | |
| 32/125/134a/1234yf/t-1234ze (A) | 30/30/16.8/7.2/16 | 398 | 1803 | 90 | 3.21 | 2729 | 102% | 101% |
| 32/125/134a/1234yf/t-1234ze (B) | 12.5/12.5/31.5/13.5/30 | 270 | 1307 | 81 | 3.31 | 1974 | 105% | 73% | roethane (HFC-134a), and 25.3 weight percent 2,3,3,3-tetrafluoropropene (HFO-1234yf). Table 5.1 lists this composition.

TABLE 5.1

| | R-32/-125/-134a/-1234yf (Weight %) |
|---|---|
| Ex. Embodiment | 24.3/24.7/25.7/25.3 |

In Examples 5-7, the term "COP" is included in the corresponding tables. As used in these examples and corresponding tables, "COP" refers to the coefficient of performance.

Turning now to Tables 5.2 and 5.3a-5.3b, performance data for the Exemplary Embodiment is provided. For comparison purposes, performance data for R-22 are provided. Additionally, performance data for R-407A, R-407C, and R-407F are provided. As evidenced by the performance data and the accompanying discussion, the Exemplary Embodiment provides several advantages over the known refrigerants R-22, R-407A, R-407C, and R-407F. Additionally, the performance data for the Exemplary Embodiment is comparable to, or better than, the performance data for the known refrigerants, which indicates that the Exemplary Embodiment is a suitable replacement for these known refrigerants.

Table 5.2 provides the GWPs for these compositions. As shown in Table 5.2, the GWP for the Exemplary Embodiment is significantly lower than the GWPs for R-22, R-407A, R-407C, and R-407F. Thus, from a GWP perspective, the Exemplary Embodiment is a desirable replacement refrigerant for R-22, R-407A, R-407C, and/or R-407F.

TABLE 5.2

| Composition | GWP |
|---|---|
| R-22 | 1810 |
| Ex. Embodiment | 1397 |
| R-407A | 2107 |
| R-407C | 1774 |
| R-407F | 1825 |

Tables 5.3a-5.3b provide performance data for R-22, the Exemplary Embodiment, R-407A, R-407C, and R-407F. It should be noted that Table 5.3b is a continuation, or an extension, of Table 5.3a and provides additional vertical columns for Table 5.3a. For example, the first horizontal row of Table 5.3a includes performance data for R-22 at a subcool amount of 6 K and an evaporator temperature of −35° C. The first horizontal row of Table 5.3b includes additional performance data for R-22 under these same conditions, i.e. at a subcool amount of 6 K and an evaporator temperature of −35° C. Similarly, the second horizontal rows of Tables 5.3a-5.3b provide performance data for the Exemplary Embodiment at a subcool amount of 6 K and an evaporator temperature of −35° C. In this way, each row in Table 5.3b provides additional data for the named composition at the operating conditions set forth in the corresponding row of Table 5.3a.

As some systems run at a subcool amount of 6 K and some systems run at a subcool amount of 0 K, for example, data for both of these conditions are provided below in Tables 5.3a-5.3b. Additionally, data included in these tables are based on the following conditions:

| | |
|---|---|
| Condenser temperature | 40° C. |
| Compressor efficiency | 70% |

TABLE 5.3A

| Composition | Subcool Amount (K) | Evaporator Temperature (° C.) | Return Gas Temperature (° C.) | Discharge Temperature (° C.) | Suction Pressure (kPa) | Suction Pressure relative to R-22 | Discharge Pressure (kPA) | Discharge Pressure relative to R-22 |
|---|---|---|---|---|---|---|---|---|
| R-22 | 6 | −35 | −15 | 144 | 131.9 | 100% | 1532 | 100% |
| Ex. Embodiment | 6 | −35 | −15 | 111 | 140 | 106% | 1745 | 114% |
| R-407A | 6 | −35 | −15 | 112 | 131 | 99% | 1719 | 112% |
| R-407C | 6 | −35 | −15 | 118 | 121 | 92% | 1625 | 106% |
| R-407F | 6 | −35 | −15 | 123 | 139 | 105% | 1799 | 117% |
| R-22 | 6 | −10 | 0 | 97 | 355 | 100% | 1532 | 100% |
| Ex. Embodiment | 6 | −10 | 0 | 79 | 387 | 109% | 1745 | 114% |
| R-407A | 6 | −10 | 0 | 79 | 371 | 105% | 1719 | 112% |
| R-407C | 6 | −10 | 0 | 82 | 346 | 97% | 1625 | 106% |
| R-407F | 6 | −10 | 0 | 85 | 390 | 110% | 1799 | 117% |
| R-22 | 0 | −35 | −15 | 143 | 132 | 100% | 1532 | 100% |
| Ex. Embodiment | 0 | −35 | −15 | 111 | 139 | 105% | 1745 | 114% |
| R-407A | 0 | −35 | −15 | 112 | 131 | 99% | 1717 | 112% |
| R-407C | 0 | −35 | −15 | 118 | 120 | 91% | 1625 | 106% |
| R-407F | 0 | −35 | −15 | 123 | 139 | 105% | 1797 | 117% |
| R-22 | 0 | −10 | 0 | 96 | 355 | 100% | 1532 | 100% |
| Ex. Embodiment | 0 | −10 | 0 | 79 | 385 | 108% | 1745 | 114% |
| R-407A | 0 | −10 | 0 | 79 | 371 | 105% | 1717 | 112% |
| R-407C | 0 | −10 | 0 | 82 | 344 | 97% | 1625 | 106% |
| R-407F | 0 | −10 | 0 | 85 | 390 | 110% | 1797 | 117% |

TABLE 5.3B

| Composition | Average Glide (K) | Capacity (kJ/m³) | Capacity relative to R-22 | COP | COP relative to R-22 | Net Refrigeration (kJ/kg) | Mass Flow for Compressor Displacement of 1 m³/min (kg/min) | Mass Flow relative to R-22 |
|---|---|---|---|---|---|---|---|---|
| R-22 | 0 | 879 | 100% | 1.611 | 100% | 161.06 | 5.46 | 100% |
| Ex. Embodiment | 4.2 | 866 | 99% | 1.534 | 95% | 148 | 5.85 | 107% |
| R-407A | 4.2 | 828 | 94% | 1.529 | 95% | 146.06 | 5.67 | 104% |
| R-407C | 4.7 | 794 | 90% | 1.561 | 97% | 159.65 | 4.97 | 91% |
| R-407F | 4.4 | 894 | 102% | 1.540 | 96% | 163.76 | 5.46 | 100% |
| R-22 | 0 | 2413 | 100% | 2.987 | 100% | 167.3 | 14.42 | 100% |
| Ex. Embodiment | 4.4 | 2506 | 104% | 2.874 | 96% | 156.1 | 16.05 | 111% |
| R-407A | 4.4 | 2444 | 101% | 2.867 | 96% | 154.1 | 15.86 | 110% |
| R-407C | 4.9 | 2359 | 98% | 2.919 | 98% | 167.9 | 14.05 | 97% |
| R-407F | 4.5 | 2604 | 108% | 2.877 | 96% | 171.6 | 15.17 | 105% |
| R-22 | 0 | 834 | 100% | 1.528 | 100% | 152.76 | 5.46 | 100% |
| Ex. Embodiment | 4.1 | 800 | 96% | 1.421 | 93% | 137.61 | 5.81 | 106% |
| R-407A | 4.1 | 770 | 92% | 1.423 | 93% | 135.9 | 5.67 | 104% |
| R-407C | 4.5 | 738 | 88% | 1.456 | 95% | 149.47 | 4.94 | 90% |
| R-407F | 4.4 | 836 | 100% | 1.441 | 94% | 153.14 | 5.46 | 100% |
| R-22 | 0 | 2293 | 100% | 2.839 | 100% | 159.0 | 14.43 | 100% |
| Ex. Embodiment | 4.2 | 2326 | 101% | 2.671 | 94% | 145.7 | 15.96 | 111% |
| R-407A | 4.3 | 2279 | 99% | 2.677 | 94% | 143.9 | 15.83 | 110% |
| R-407C | 4.7 | 2202 | 96% | 2.73 | 96% | 157.69 | 13.96 | 97% |
| R-407F | 4.4 | 2440 | 106% | 2.700 | 95% | 161.0 | 15.16 | 105% |

As shown in Tables 5.3a-5.3b, the Exemplary Embodiment provides several advantages over the known refrigerants R-22, R-407A, R-407C, and R-407F. For example, the Exemplary Embodiment has a significantly lower discharge temperature than do most of the other compositions. In fact, R-407A is the only composition listed above that has, under certain conditions, a discharge temperature as low as the discharge temperature for the Exemplary Embodiment. The discharge temperature refers to the exit temperature at a compressor of a heat transfer system. A high discharge temperature can require cooling, such as internal and/or external cooling, at the compressor. A high discharge temperature can also shorten the length of the life of the compressor. For example, a compressor operating at a high discharge temperature might not last as long as a compressor operating at a low discharge temperature. Thus, the low discharge temperature associated with the Exemplary Embodiment provides advantages over the other known refrigerants.

A comparison of the capacity and COP for the Exemplary Embodiment with the capacity and COP for R-22, R-407A, R-407C, and R-407F indicates that the Exemplary Embodiment is a suitable replacement for these known refrigerants. Capacity and COP are helpful indicators in this regard, because capacity measures the amount of cooling a refrigerant provides and COP measures the amount of energy required to provide that cooling. Thus, if a proposed replacement for a known refrigerant has a capacity and COP that is similar to, or greater than, the capacity and COP for the known refrigerant, this indicates that the proposed refrigerant is likely a suitable replacement for the known refrigerant. Here, Tables 5.3a-5.3b show that the Exemplary Embodiment has a capacity and COP that are similar to, or greater than, the capacity and COP for the other known refrigerants. In particular, the COP for the Exemplary Embodiment is within 7% of the COP for the known refrigerants. Thus, the Exemplary Embodiment is a suitable replacement for R-22, R-407A, R-407C, and/or R-407F.

Finally, the mass flow rate for the Exemplary Embodiment is similar to the mass flow rates for R-22, R-407A, R-407C, and R-407F. This similarity in mass flow rate may indicate that the Exemplary Embodiment is suitable for replacing these known refrigerants in systems designed for use with the known refrigerants. For example, a thermal expansion valve included in a heat transfer system may be compatible with both the known refrigerants and the Exemplary Embodiment due to the similarity in mass flow rates. In other words, the Exemplary Embodiment may be a good candidate for a field retrofit in a system that was designed for use with the known refrigerants, or other similar refrigerants, as the expansion device included in the system may not need to be replaced and/or modified.

Example 6

Refrigeration Performance

Examples 6-7 include performance data for the refrigerant R-22 and performance data for two comparative examples. As evidenced by the performance data and accompanying discussion, the Exemplary Embodiment provides several advantages over R-22 and the comparative examples. Additionally, the Exemplary Embodiment is better suited for replacing R-22 than is either the comparative example (C) or the comparative example (D).

Comparative example (C) is a composition including 25 weight percent difluoromethane (HFC-32), 25 weight percent pentafluoroethane (HFC-125), 25 weight percent 1,1,1,2-tetrafluoroethane (HFC-134a), and 25 weight percent 2,3,3,3-tetrafluoropropene (HFO-1234yf). Comparative example (D) is a composition including 25 weight percent difluoromethane (HFC-32), 25 weight percent pentafluoroethane (HFC-125), 20 weight percent 1,1,1,2-tetrafluoroethane (HFC-134a), and 30 weight percent 2,3,3,3-tetrafluoropropene (HFO-1234yf).

Table 6.1 summarizes the compositions corresponding to the short-hand notations utilized in the tables that follow in Examples 6-7.

TABLE 6.1

| | R-32/-125/-134a/-1234yf (Weight %) |
|---|---|
| Ex. Embodiment | 24.3/24.7/25.7/25.3 |
| Comparative (C) | 25/25/25/25 |
| Comparative (D) | 25/25/20/30 |

Table 6.2 provides the GWPs for R-22, the Exemplary Embodiment, and comparative examples (C) and (D).

TABLE 6.2

| Composition | GWP |
|---|---|
| R-22 | 1810 |
| Ex. Embodiment | 1397 |
| Comparative (C) | 1402 |
| Comparative (D) | 1331 |

As shown in Table 6.2, the Exemplary Embodiment has a GWP that is under 1400. This is lower than the GWPs for both R-22 and comparative example (C). This GWP makes the Exemplary Embodiment a desirable replacement for R-22 or a similar refrigerant having a high GWP. It also makes the Exemplary Embodiment a desirable refrigerant for a new heat transfer system.

Tables 6.3a-6.3b include performance data for R-22, the Exemplary Embodiment, and comparative examples (C) and (D). As with Tables 5.3a-5.3b, Table 6.3b is a continuation, or an extension, of Table 6.3a and provides additional vertical columns for Table 6.3a. For example, the first horizontal rows of Tables 6.3a-6.3b provide performance data for R-22 at an evaporator temperature of −20° C. The second horizontal rows of these tables provide performance data for the Exemplary Embodiment at an evaporator temperature of −20° C. In this way, each row in Table 6.3b provides additional data for the named composition at the operating conditions set forth in the corresponding row of Table 6.3a.

Tables 6.3a-6.3b include data for a medium evaporator temperature, ranging from −20° C. to 0° C. The data are based on the following conditions:

| | |
|---|---|
| Condenser temperature | 40° C. |
| Subcool amount | 6 K |
| Compressor efficiency | 70% |

TABLE 6.3A

| Composition | Evaporator Temperature (° C.) | Return Gas Temperature (° C.) | Discharge Temperature (° C.) | Suction Pressure (kPA) | Suction Pressure relative to R-22 | Discharge Pressure (kPA) | Discharge Pressure relative to R-22 | Average Glide (K) |
|---|---|---|---|---|---|---|---|---|
| R-22 | −20 | −10 | 108.9 | 245 | 100% | 1532 | 100% | 0 |
| Ex. Embodiment | −20 | −10 | 86.1 | 265 | 108% | 1745 | 114% | 4.3 |
| Comparative (C) | −20 | −10 | 86.6 | 268 | 109% | 1761 | 115% | 4.3 |
| Comparative (D) | −20 | −10 | 85.6 | 273 | 111% | 1776 | 116% | 4.3 |
| R-22 | −15 | −5 | 102.5 | 296 | 100% | 1532 | 100% | 0 |
| Ex. Embodiment | −15 | −5 | 82.2 | 321 | 108% | 1745 | 114% | 4.4 |
| Comparative (C) | −15 | −5 | 82.6 | 325 | 110% | 1761 | 115% | 4.3 |
| Comparative (D) | −15 | −5 | 82.2 | 331 | 112% | 1776 | 116% | 4.3 |
| R-22 | −10 | 0 | 96.5 | 355 | 100% | 1532 | 100% | 0 |
| Ex. Embodiment | −10 | 0 | 78.6 | 387 | 109% | 1745 | 114% | 4.4 |
| Comparative (C) | −10 | 0 | 78.9 | 391 | 110% | 1761 | 115% | 4.4 |
| Comparative (D) | −10 | 0 | 78.1 | 398 | 112% | 1776 | 116% | 4.3 |
| R-22 | −5 | 5 | 90.8 | 421 | 100% | 1532 | 100% | 0 |
| Ex. Embodiment | −5 | 5 | 75.1 | 462 | 110% | 1745 | 114% | 4.4 |
| Comparative (C) | −5 | 5 | 75.5 | 467 | 111% | 1761 | 115% | 4.4 |
| Comparative (D) | −5 | 5 | 74.8 | 475 | 113% | 1776 | 116% | 4.4 |
| R-22 | 0 | 10 | 85.4 | 497 | 100% | 1532 | 100% | 0 |
| Ex. Embodiment | 0 | 10 | 71.9 | 549 | 110% | 1745 | 114% | 4.5 |
| Comparative (C) | 0 | 10 | 72.2 | 554 | 111% | 1761 | 115% | 4.4 |
| Comparative (D) | 0 | 10 | 71.6 | 562 | 113% | 1776 | 116% | 4.4 |

TABLE 6.3B

| Composition | Capacity (kJ/m³) | Capacity relative to R-22 | COP | COP relative to R-22 | Net Refrigeration (kJ/kg) | Mass Flow for Compressor Displacement of 1 m³/min (kg/min) | Mass Flow relative to R-22 |
|---|---|---|---|---|---|---|---|
| R-22 | 1655 | 100% | 2.299 | 100% | 162.5 | 10.19 | 100% |
| Ex. Embodiment | 1675 | 101.2% | 2.193 | 95.4% | 150.0 | 11.17 | 109.6% |
| Comparative (C) | 1693 | 102.3% | 2.191 | 95.3% | 150.6 | 11.25 | 110.4% |
| Comparative (D) | 1706 | 103.1% | 2.184 | 95.0% | 148.1 | 11.52 | 113.1% |
| R-22 | 2006 | 100% | 2.611 | 100% | 164.9 | 12.16 | 100% |
| Ex. Embodiment | 2057 | 102.5% | 2.501 | 95.8% | 153.1 | 13.44 | 110.5% |
| Comparative (C) | 2077 | 103.5% | 2.500 | 95.7% | 153.7 | 13.52 | 111.2% |
| Comparative (D) | 2092 | 104.3% | 2.492 | 95.4% | 151.2 | 13.84 | 113.8% |
| R-22 | 2413 | 100% | 2.987 | 100% | 167.3 | 14.42 | 100% |
| Ex. Embodiment | 2506 | 103.9% | 2.874 | 96.2% | 156.1 | 16.05 | 111.3% |
| Comparative (C) | 2530 | 104.8% | 2.871 | 96.1% | 156.7 | 16.15 | 112.0% |
| Comparative (D) | 2546 | 105.5% | 2.863 | 95.8% | 154.2 | 16.51 | 114.5% |
| R-22 | 2882 | 100% | 3.449 | 100% | 169.6 | 17.00 | 100% |
| Ex. Embodiment | 3031 | 105.2% | 3.331 | 96.6% | 159.1 | 19.05 | 112.1% |

TABLE 6.3B-continued

| Composition | Capacity (kJ/m³) | Capacity relative to R-22 | COP | COP relative to R-22 | Net Refrigeration (kJ/kg) | Mass Flow for Compressor Displacement of 1 m³/min (kg/min) | Mass Flow relative to R-22 |
|---|---|---|---|---|---|---|---|
| Comparative (C) | 3059 | 106.1% | 3.328 | 96.5% | 159.7 | 19.16 | 112.7% |
| Comparative (D) | 3077 | 106.8% | 3.319 | 96.2% | 157.2 | 19.58 | 115.2% |
| R-22 | 3421 | 100% | 4.027 | 100% | 171.8 | 19.91 | 100% |
| Ex. Embodiment | 3642 | 106.5% | 3.905 | 97.0% | 162.0 | 22.48 | 112.9% |
| Comparative (C) | 3674 | 107.4% | 3.901 | 96.9% | 162.6 | 22.60 | 113.5% |
| Comparative (D) | 3694 | 108.0% | 3.892 | 96.6% | 160.1 | 23.08 | 115.9% |

As shown in Tables 6.3a-6.3b, the Exemplary Embodiment provides several advantages over R-22 and the comparative examples. For example, the Exemplary Embodiment is associated with a discharge temperature that is significantly lower than the discharge temperature associated with R-22. Under some conditions, the discharge temperature for the Exemplary Embodiment is lower than the comparative examples (C) and (D). As mentioned, a low discharge temperature is desirable, because it alleviates the need for cooling at the compressor and potentially extends the life of the compressor.

While the suction and discharge pressures for the Exemplary Embodiment are higher than those for R-22, the pressures associated with the Exemplary Embodiment are closer to the R-22 pressures than are the pressures associated with either of the comparative examples. The Exemplary Embodiment pressures are close enough to the R-22 pressures that the Exemplary Embodiment is a viable candidate for a field retrofit in a system designed for use with R-22 or a similar refrigerant. In other words, due to the similarity in pressures, equipment designed for use with R-22 may also be compatible with the Exemplary Embodiment. This may not be true for the comparative examples.

Additionally, the capacity of the Exemplary Embodiment closely matches the capacity of R-22. The Exemplary Embodiment also has a COP that is close to the COP for R-22. In particular, the Exemplary Embodiment COP is closer to the R-22 COP than is the COP for either of the comparative examples. As explained above, this similarity in capacity and COP indicates that the Exemplary Embodiment is a suitable replacement for R-22, and that it is a better replacement for R-22 than is either of the comparative examples.

Finally, the mass flow rate for the Exemplary Embodiment is closer to the mass flow rate for R-22 than is the mass flow rate for either of the comparative examples. As mentioned above, this means that the Exemplary Embodiment may be compatible with an expansion device included in a heat transfer system designed for use with R-22 or a similar refrigerant.

Example 7

Refrigeration Performance

In Examples 6, performance data for R-22, the Exemplary Embodiment, and the comparative examples was based on a subcool amount of 6 K. Some systems operate at 0 K. Thus, Tables 7a-7b provide performance data for these compositions based on a subcool amount of 0 K. As with Tables 5.3a-5.3b and 6.3a-6.3b, Table 7b is a continuation, or an extension, of Table 7a and provides additional vertical columns for Table 7a. For example, the first horizontal rows of Tables 7a-7b provide performance data for R-22 at an evaporator temperature of −10° C. The second horizontal rows of these tables provide performance data for the Exemplary Embodiment at an evaporator temperature of −10° C. In this way, each row in Table 7b provides additional data for the named composition at the operating conditions set forth in the corresponding row of Table 7a.

Additionally, the data included in Tables 7a-7b are based on the following conditions:

| Condenser temperature | 40° C. |
|---|---|
| Subcool amount | 0 K |
| Compressor efficiency | 70% |

TABLE 7A

| Composition | Evaporator Temperature (° C.) | Return Gas Temperature (° C.) | Discharge Temperature (° C.) | Suction Pressure (kPA) | Suction Pressure relative to R-22 | Discharge Pressure (kPA) | Discharge Pressure relative to R-22 | Average Glide (K) |
|---|---|---|---|---|---|---|---|---|
| R-22 | −10 | 0 | 96.5 | 355 | 100% | 1532 | 100% | 0 |
| Ex. Embodiment | −10 | 0 | 78.8 | 385 | 108% | 1745 | 114% | 4.2 |
| Comparative (C) | −10 | 0 | 79.2 | 389 | 110% | 1761 | 115% | 4.2 |
| Comparative (D) | −10 | 0 | 78.4 | 396 | 112% | 1778 | 116% | 4.2 |

TABLE 7B

| Composition | Capacity (kJ/m³) | Capacity relative to R-22 | COP | COP relative to R-22 | Net Refrigeration (kJ/kg) | Mass Flow for Compressor Displacement of 1 m³/min (kg/min) | Mass Flow relative to R-22 |
|---|---|---|---|---|---|---|---|
| R-22 | 2293 | 100% | 2.839 | 100.0% | 159.0 | 14.43 | 100% |
| Ex. Embodiment | 2326 | 101% | 2.671 | 94.1% | 145.7 | 15.96 | 110.7% |
| Comparative (C) | 2348 | 102% | 2.669 | 94.0% | 146.2 | 16.06 | 111.4% |
| Comparative (D) | 2360 | 103% | 2.658 | 93.6% | 143.7 | 16.42 | 113.9% |

Tables 7a-7b show that the Exemplary Embodiment provides advantages over R-22 and the comparative examples, and the tables also show that the Exemplary Embodiment is a suitable replacement for R-22 at a subcool amount of 0 K. In particular, the Exemplary Embodiment is associated with a discharge temperature that is significantly lower than the discharge temperature associated with R-22, which provides advantages discussed above. Furthermore, the suction and discharge pressures for the Exemplary Embodiment are closer to the R-22 pressures than are the pressures associated with either of the comparative examples. As explained above, this similarity in pressures makes the Exemplary Embodiment a viable candidate for a field retrofit in a system designed for use with R-22 or a similar refrigerant.

Additionally, the capacity of the Exemplary Embodiment closely matches the capacity of R-22. The Exemplary Embodiment also has a COP that is close to the COP for R-22. In particular, the Exemplary Embodiment COP is closer to the R-22 COP than is the COP for either of the comparative examples. This similarity in performance data indicates that the Exemplary Embodiment is a suitable replacement for R-22, as explained above.

Finally, the mass flow rate for the Exemplary Embodiment is closer to the mass flow rate for R-22 than is the mass flow rate for either of the comparative examples. As mentioned above, this means that the Exemplary Embodiment may be compatible with an expansion device included in a heat transfer system designed for use with R-22 or a similar refrigerant.

As indicated by the data and discussion included in the Examples above, the Exemplary Embodiment provides several advantages over known refrigerants and is a suitable substitute for various known refrigerants. For example, as discussed in Example 5, the Exemplary Embodiment is a suitable replacement for R-22, R-407A, R-407C, and/or R-407F. Furthermore, as discussed in Examples 6-7, the Exemplary Embodiment is better suited to replace R-22, or other similar refrigerants, than are the comparative examples (C) and (D). The Exemplary Embodiment is also a desirable refrigerant for use in new heat transfer systems.

While the above examples focus on a composition corresponding to the Exemplary Embodiment, it will be understood that the discussion regarding the advantages of the composition and the suitability of the composition for replacing other known refrigerants is also applicable to other compositions disclosed herein. For example, this discussion may also apply to a composition including from 23.3 weight percent to 24.5 weight percent difluoromethane (HFC-32), from 24.5 weight percent to 25.7 weight percent pentafluoroethane (HFC-125), from 25.5 weight percent to 26.7 weight percent 1,1,1,2-tetrafluoroethane (HFC-134a), and from 24.3 weight percent to 25.5 weight percent 2,3,3,3-tetrafluoropropene (HFO-1234yf).

Selected Embodiments

Embodiment A1

A composition comprising:
from 23.3 weight % to 24.5 weight % difluoromethane;
from 24.5 weight % to 25.7 weight % pentafluoroethane;
from 25.5 weight % to 26.7 weight % 1,1,1,2-tetrafluoroethane; and
from 24.3 weight % to 25.5 weight % 2,3,3,3-tetrafluoropropene.

Embodiment A2

The composition of Embodiment A1 comprising:
24.3 weight % difluoromethane;
24.7 weight % pentafluoroethane;
25.7 weight % 1,1,1,2-tetrafluoroethane; and
25.3 weight % 2,3,3,3-tetrafluoropropene.

Embodiment A3

The composition of any of Embodiments A1-A2, wherein the composition is a replacement refrigerant that replaces a refrigerant comprising at least one of R-407A, R-407C, R-407F, or R-22.

Embodiment A4

The composition of any of Embodiments A1-A3 further comprising a non-refrigerant component.

Embodiment A5

The composition of Embodiment A4, wherein the non-refrigerant component comprises at least one of a lubricant, dye, solubilizing agent, compatibilizer, stabilizer, tracer, perfluoropolyether, anti-wear agent, extreme pressure agent, corrosion and oxidation inhibitor, metal surface energy reducer, metal surface deactivator, free radical scavenger, foam control agent, viscosity index improver, pour point depressant, detergent, or viscosity adjuster.

Embodiment A6

The composition of Embodiment A5, wherein the non-refrigerant component is the lubricant, the lubricant comprising at least one of a mineral oil, alkyl substituted aromatic, alkylbenzene, synthetic paraffin and naphthene, poly (alpha olefin), polyglycol, polyalkylene glycol, dibasic acid ester, polyester, polyol ester, neopentyl ester, polyvinyl ether, perfluoropolyether, silicone, silicate ester, fluorinated compound, phosphate ester, or polycarbonate.

Embodiment A7

The composition of any of Embodiments A1-A6, wherein when the composition is used as a heat transfer fluid in a heat transfer system including an evaporator that operates at a medium evaporator temperature, the composition has a refrigeration capacity that is within 7% of an R-22 refrigeration capacity when used in the heat transfer system including the evaporator that operates at the medium evaporator temperature.

Embodiment A8

The composition of any of Embodiments A1-A7, wherein the composition has a global warming potential that is less than or equal to 1400.

Embodiment B1

A heat transfer system comprising
an evaporator that operates at a medium temperature; and
a heat transfer fluid comprising:
from 23.3 weight % to 24.5 weight % difluoromethane;
from 24.5 weight % to 25.7 weight % pentafluoroethane;
from 25.5 weight % to 26.7 weight % 1,1,1,2-tetrafluoroethane; and
from 24.3 weight % to 25.5 weight % 2,3,3,3-tetrafluoropropene.

Embodiment B2

The heat transfer system of Embodiment B1, wherein the heat transfer fluid comprises:
24.3 weight % difluoromethane;
24.7 weight % pentafluoroethane;
25.7 weight % 1,1,1,2-tetrafluoroethane; and
25.3 weight % 2,3,3,3-tetrafluoropropene.

Embodiment B3

The heat transfer system of any of Embodiments B1-B2, wherein the heat transfer system was designed for use with at least one of R-407A, R-407C, R-407F, or R-22.

Embodiment B4

The heat transfer system of any of Embodiments B1-B3 further comprising an expansion device designed for use with the at least one of R-407A, R-407C, R-407F, or R-22.

Embodiment B5

The heat transfer system of any of Embodiments B1-B4, wherein the medium temperature comprises a temperature from −20° C. to 0° C.

Embodiment B6

The heat transfer system of any of Embodiments B1-B5 further comprising a compressor having a discharge temperature that is lower than an R-22 discharge temperature that results at the compressor when the heat transfer system is charged with an R-22 refrigerant.

Embodiment C1

A method of replacing an R-22 refrigerant in a heat transfer system that was designed for use with the R-22 refrigerant, the method comprising:
charging the heat transfer system that was designed for use with the R-22 refrigerant with a composition comprising:
from 23.3 weight % to 24.5 weight % difluoromethane;
from 24.5 weight % to 25.7 weight % pentafluoroethane;
from 25.5 weight % to 26.7 weight % 1,1,1,2-tetrafluoroethane; and
from 24.3 weight % to 25.5 weight % 2,3,3,3-tetrafluoropropene.

Embodiment C2

The method of Embodiment C1, wherein the composition comprises:
24.3 weight % difluoromethane;
24.7 weight % pentafluoroethane;
25.7 weight % 1,1,1,2-tetrafluoroethane; and
25.3 weight % 2,3,3,3-tetrafluoropropene.

Embodiment C3

The method of any of Embodiments C1-C2, further comprising evaporating the composition at an evaporator of the heat transfer system, wherein the evaporator operates at a medium temperature.

Embodiment C4

The method of Embodiment C3, wherein the medium temperature comprises a temperature from −20° C. to 0° C.

Embodiment C5

The method of any of Embodiments C1-C4, further comprising compressing the composition at a compressor of the heat transfer system, wherein the compressor is associated with a discharge temperature that is lower than an R-22 discharge temperature that results when the heat transfer system is charged with the R-22 refrigerant.

Embodiment C6

The method of any of Embodiments C1-C5, wherein the composition further comprises a non-refrigerant component.

What is claimed is:
1. A heat transfer system comprising:
an evaporator that operates at a temperature from about −15° C. to about 0° C.; and
a heat transfer fluid comprising a refrigerant consisting of:
24.3 weight % difluoromethane;
24.7 weight % pentafluoroethane;
25.7 weight % 1,1,1,2-tetrafluoroethane; and
25.3 weight % 2,3,3,3-tetrafluoropropene;
wherein said refrigerant is classified by ASHRAE as non-flammable; and
wherein said heat transfer system is a refrigeration system designed for use with the at least one of R-407A, R-407F, or R-22.
2. The heat transfer system of claim 1 further comprising an expansion device designed for use with at least one of R-407A, R-407F, or R-22.
3. The heat transfer system of claim 1 further comprising a compressor having a discharge temperature that is lower than an R-22 discharge temperature that results at the compressor when the heat transfer system is charged with an R-22 refrigerant.

4. The heat transfer system of claim 1, wherein the composition further comprises a non-refrigerant component.

5. The heat transfer system of claim 4, wherein the non-refrigerant component comprises at least one of a lubricant, dye, solubilizing agent, compatibilizer, stabilizer, tracer, perfluoropolyether, anti-wear agent, extreme pressure agent, corrosion and oxidation inhibitor, metal surface energy reducer, metal surface deactivator, free radical scavenger, foam control agent, viscosity index improver, pour point depressant, detergent, or viscosity adjuster.

6. The heat transfer system of claim 5, wherein the non-refrigerant component is the lubricant, the lubricant comprising at least one of a mineral oil, alkyl substituted aromatic, alkylbenzene, synthetic paraffin and naphthene, poly (alpha olefin), polyglycol, polyalkylene glycol, dibasic acid ester, polyester, polyol ester, neopentyl ester, polyvinyl ether, perfluoropolyether, silicone, silicate ester, fluorinated compound, phosphate ester, or polycarbonate.

7. The heat transfer system of claim 1, wherein the refrigeration system further comprises an expansion device designed for use with R22, R-407A or R-407F.

8. A method of replacing an R-22 refrigerant in a heat transfer system that was designed for use with the R-22 refrigerant, the method comprising:
charging the heat transfer system that was designed for use with the R-22 refrigerant with a composition comprising a refrigerant consisting of:
24.3 weight % difluoromethane;
24.7 weight % pentafluoroethane;
25.7 weight % 1,1,1,2-tetrafluoroethane; and
25.3 weight % 2,3,3,3-tetrafluoropropene; wherein said refrigerant is classified by ASHRAE as non-flammable; and wherein said heat transfer system comprises an evaporator operating at a temperature from −15° C. to 0° C.

9. The method of claim 8, further comprising compressing the composition at a compressor of the heat transfer system, wherein the compressor is associated with a discharge temperature that is lower than an R-22 discharge temperature that results when the heat transfer system is charged with the R-22 refrigerant.

10. The method of claim 8, wherein the composition further comprises a non-refrigerant component.

11. The method of claim 10, wherein the non-refrigerant component comprises at least one of a lubricant, dye, solubilizing agent, compatibilizer, stabilizer, tracer, perfluoropolyether, anti-wear agent, extreme pressure agent, corrosion and oxidation inhibitor, metal surface energy reducer, metal surface deactivator, free radical scavenger, foam control agent, viscosity index improver, pour point depressant, detergent, or viscosity adjuster.

12. The method of claim 11, wherein the non-refrigerant component is the lubricant, the lubricant comprising at least one of a mineral oil, alkyl substituted aromatic, alkylbenzene, synthetic paraffin and naphthene, poly (alpha olefin), polyglycol, polyalkylene glycol, dibasic acid ester, polyester, polyol ester, neopentyl ester, polyvinyl ether, perfluoropolyether, silicone, silicate ester, fluorinated compound, phosphate ester, or polycarbonate.

13. The method of claim 8, wherein said heat transfer system further comprises an expansion device designed for use with R22.

14. A method of replacing R-407A or R-407F refrigerant in a heat transfer system that was designed for use with the R-407A or R-407F refrigerant, the method comprising:
charging the heat transfer system that was designed for use with the R-22 refrigerant with a composition comprising a refrigerant consisting of:
24.3 weight % difluoromethane;
24.7 weight % pentafluoroethane;
25.7 weight % 1,1,1,2-tetrafluoroethane; and
25.3 weight % 2,3,3,3-tetrafluoropropene; wherein said refrigerant is classified by ASHRAE as non-flammable; and wherein said heat transfer system comprises an evaporator operating at a temperature from −15° C. to 0° C.

15. The method of claim 14, wherein the composition further comprises a non-refrigerant component.

16. The method of claim 15, wherein the non-refrigerant component comprises at least one of a lubricant, dye, solubilizing agent, compatibilizer, stabilizer, tracer, perfluoropolyether, anti-wear agent, extreme pressure agent, corrosion and oxidation inhibitor, metal surface energy reducer, metal surface deactivator, free radical scavenger, foam control agent, viscosity index improver, pour point depressant, detergent, or viscosity adjuster.

17. The method of claim 16, wherein the non-refrigerant component is the lubricant, the lubricant comprising at least one of a mineral oil, alkyl substituted aromatic, alkylbenzene, synthetic paraffin and naphthene, poly (alpha olefin), polyglycol, polyalkylene glycol, dibasic acid ester, polyester, polyol ester, neopentyl ester, polyvinyl ether, perfluoropolyether, silicone, silicate ester, fluorinated compound, phosphate ester, or polycarbonate.

18. The heat transfer system of claim 14, wherein the refrigeration system further comprises an expansion device designed for use with R-407A or R-407F.

* * * * *